US012207047B2

(12) United States Patent
Combet et al.

(10) Patent No.: US 12,207,047 B2
(45) Date of Patent: Jan. 21, 2025

(54) SOUND DIFFUSION DEVICE WITH CONTROLLED BROADBAND DIRECTIVITY

(71) Applicant: L-ACOUSTICS, Marcoussis (FR)

(72) Inventors: Christophe Combet, Antony (FR); Christian Heil, London (GB); Mathias Remy, Les Ulis (FR)

(73) Assignee: L-ACOUSTICS, Marcoussis (FR)

( * ) Notice: Subject to any disclaimer, the term of this patent is extended or adjusted under 35 U.S.C. 154(b) by 405 days.

(21) Appl. No.: 17/753,615

(22) PCT Filed: Sep. 3, 2020

(86) PCT No.: PCT/EP2020/074620
§ 371 (c)(1),
(2) Date: Oct. 25, 2022

(87) PCT Pub. No.: WO2021/047993
PCT Pub. Date: Mar. 18, 2021

(65) Prior Publication Data

US 2023/0053097 A1 Feb. 16, 2023

(30) Foreign Application Priority Data

Sep. 9, 2019 (FR) ...................................... 1909890

(51) Int. Cl.

| | |
|---|---|
| ***H04R 1/34*** | (2006.01) |
| ***H04R 1/02*** | (2006.01) |
| ***H04R 1/24*** | (2006.01) |
| ***H04R 1/28*** | (2006.01) |
| ***H04R 3/12*** | (2006.01) |

(52) U.S. Cl.
CPC ............. *H04R 1/345* (2013.01); *H04R 1/025* (2013.01); *H04R 1/24* (2013.01); *H04R 1/2826* (2013.01); *H04R 3/12* (2013.01)

(58) Field of Classification Search
CPC .......... H04R 1/345; H04R 1/025; H04R 1/24; H04R 1/2826; H04R 3/12; H04R 27/00; H04R 1/02; H04R 1/403; H04R 1/2819
See application file for complete search history.

(56) References Cited

U.S. PATENT DOCUMENTS

| | | | | |
|---|---|---|---|---|
| 2,610,694 A * | 9/1952 | De Boer | .................. | H04R 5/02 381/160 |
| 3,688,864 A * | 9/1972 | Guss | ........................ | H04R 1/26 381/186 |
| 4,612,665 A | 9/1986 | Inami et al. | | |

(Continued)

FOREIGN PATENT DOCUMENTS

| | | |
|---|---|---|
| EP | 1635606 A1 | 3/2006 |
| FR | 2364585 A1 | 4/1978 |
| JP | H0698392 | 4/1994 |

OTHER PUBLICATIONS

AFMG Ahnert Feistel Media Group: "Ease Focus Version 2," Rev Mar. 3, 2014. www.vueaudio.com/vue-Qackage/ease-focus-2-5-manual-pdf/"?wpdmd 1 =4679&ind=0, 62 pages.

(Continued)

*Primary Examiner* — Oyesola C Ojo
(74) *Attorney, Agent, or Firm* — Conley Rose, P.C.

(57) ABSTRACT

A loudspeaker enclosure comprising a plurality of acoustic sources and having controlled broad-band directivity.

8 Claims, 18 Drawing Sheets

(56) References Cited

U.S. PATENT DOCUMENTS

| | | | | | |
|---|---|---|---|---|---|
| 5,163,167 | A * | 11/1992 | Heil | H04R 1/345 | 181/185 |
| 5,949,893 | A * | 9/1999 | Augustin | H04R 1/345 | 381/160 |
| 7,298,860 | B2 * | 11/2007 | Engebretson | H04R 1/26 | 381/87 |
| 9,179,236 | B2 * | 11/2015 | Robinson | H04S 7/30 | |
| 10,261,519 | B2 * | 4/2019 | Di Censo | H04S 7/302 | |
| 10,375,468 | B2 * | 8/2019 | Spillmann | H04R 1/323 | |
| 11,006,211 | B2 | 5/2021 | Heil et al. | | |
| 2004/0218773 | A1 * | 11/2004 | Andrews | G10K 11/32 | 381/386 |
| 2008/0212805 | A1 * | 9/2008 | Fincham | H03G 3/004 | 381/160 |
| 2009/0214067 | A1 | 8/2009 | Bothe | | |
| 2011/0096947 | A1 | 4/2011 | Oxford et al. | | |
| 2012/0014544 | A1 | 1/2012 | Gladwin et al. | | |
| 2017/0251296 | A1 * | 8/2017 | Smithers | H04R 3/14 | |
| 2017/0280231 | A1 * | 9/2017 | Johnson | H04R 1/2803 | |
| 2018/0167722 | A1 * | 6/2018 | Christner | H04R 27/00 | |
| 2018/0249243 | A1 * | 8/2018 | Honda | H04R 1/26 | |
| 2020/0068296 | A1 * | 2/2020 | Heil | G10K 11/34 | |
| 2021/0006917 | A1 * | 1/2021 | Heil | H04R 1/2819 | |
| 2022/0225018 | A1 * | 7/2022 | Hayasaka | H04R 1/025 | |

OTHER PUBLICATIONS

AFMG "Focus Your Sub Arrays," Prolight and Sound. Apr. 7, 2017, 30 pages.

Brown J., "Systems for Stereophonic Sound Reinforcement: Performance Criteria, Design Techniques and Practical Examples," 113th AES Convention. Oct. 5-8, 2002, 20 pages.

DASAudioSpain: "Ease Focus V2," YouTube May 10, 2012, https://www.youtube.com/watch?v=G5nA01 AZe-k, 8 pages.

International Search Report and Written Opinion for PCT/FR2018/050060, mailed Apr. 17, 2018, 14 pages.

International Search Report and Written Opinion for PCT/FR2018/052636, mailed Jan. 24, 2019, 12 pages.

PCT Search Report and Written Opinion Corresponding to PCT/EP2020/074620, dated Nov. 18, 2020.

* cited by examiner

[Fig. 1]
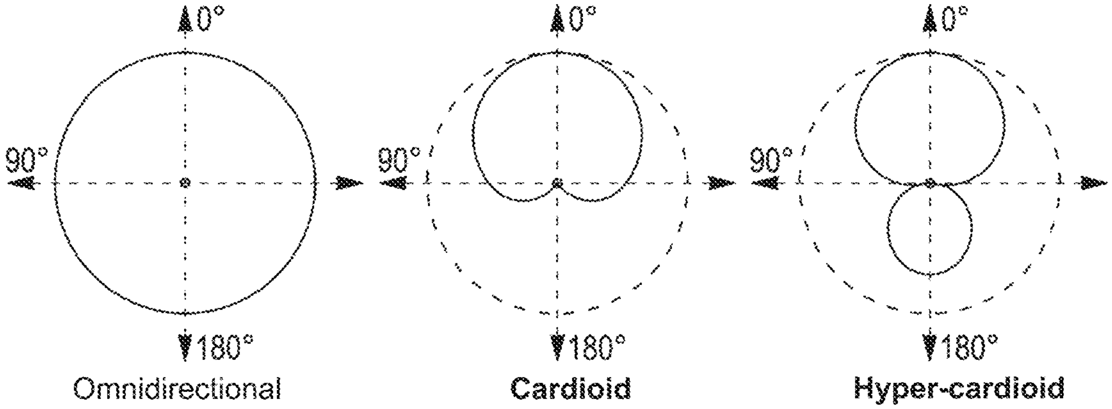
[Fig. 2]
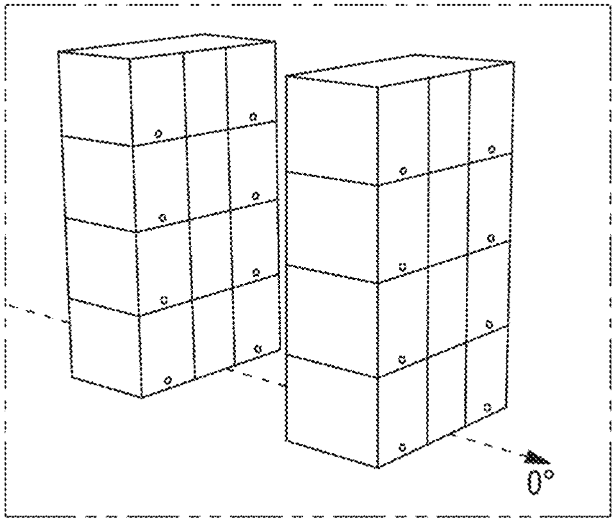

[Fig. 3]
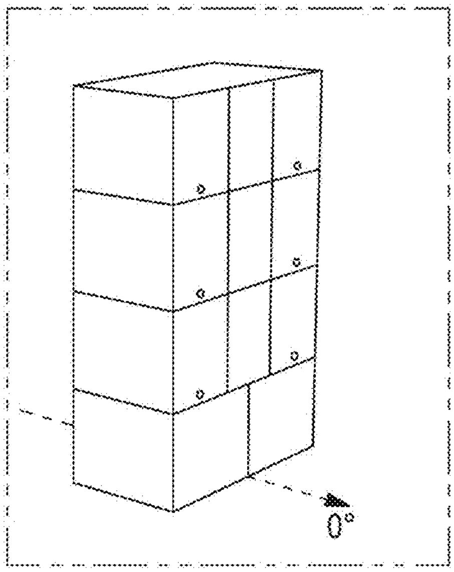
[Fig. 4A]
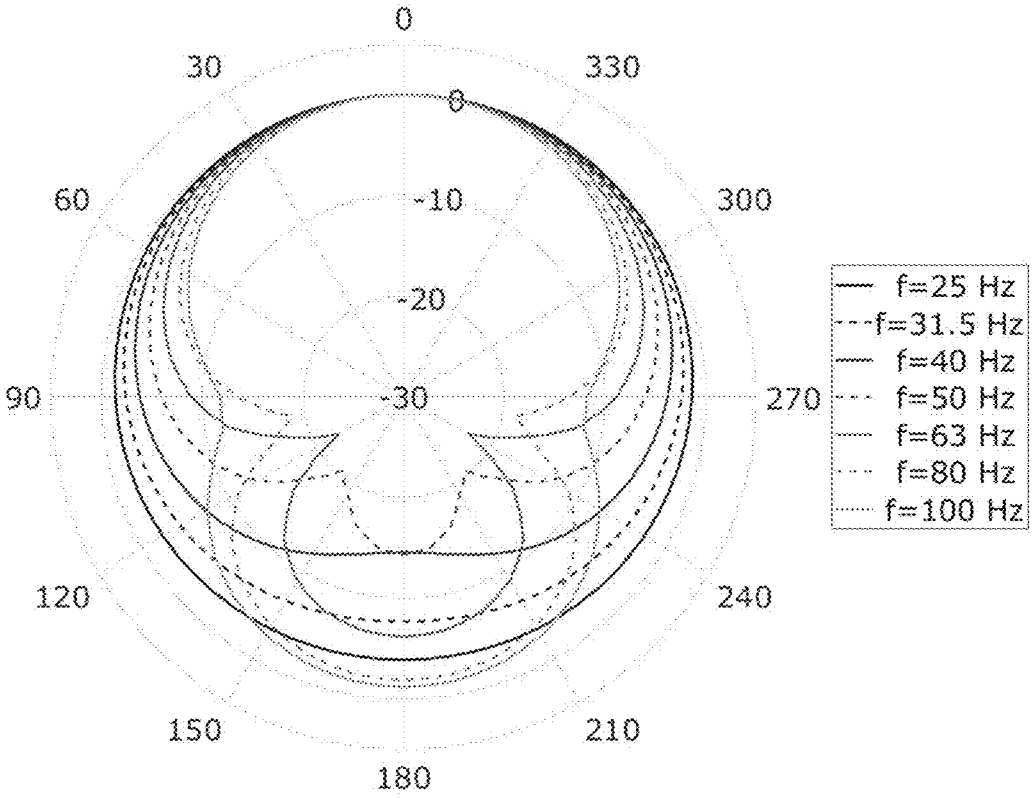

[Fig. 4B]
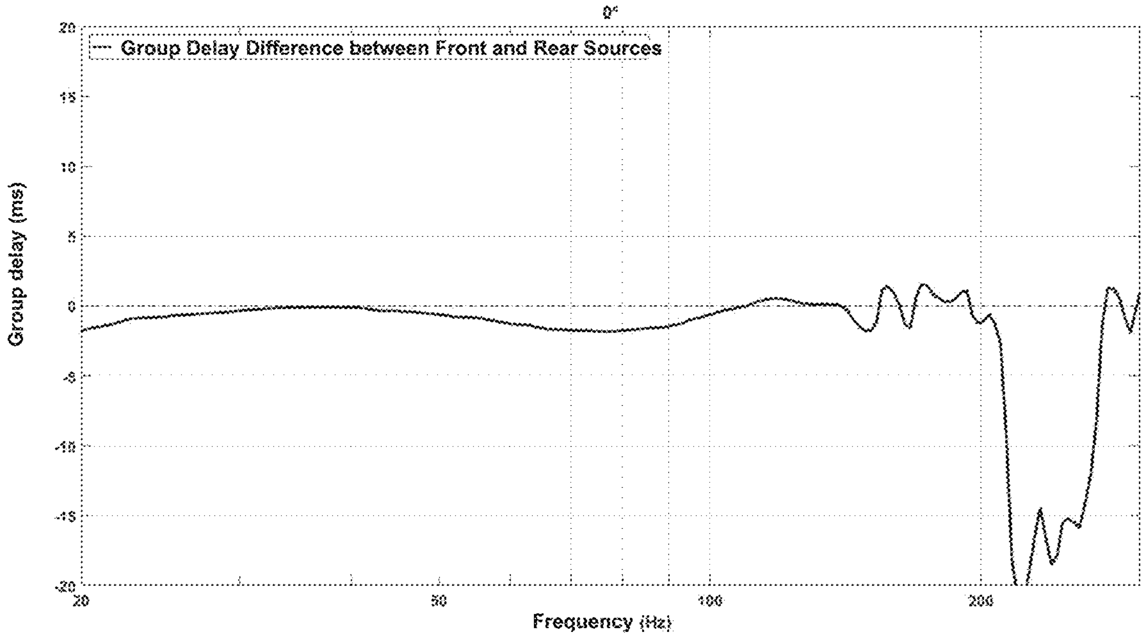
[Fig. 4C]
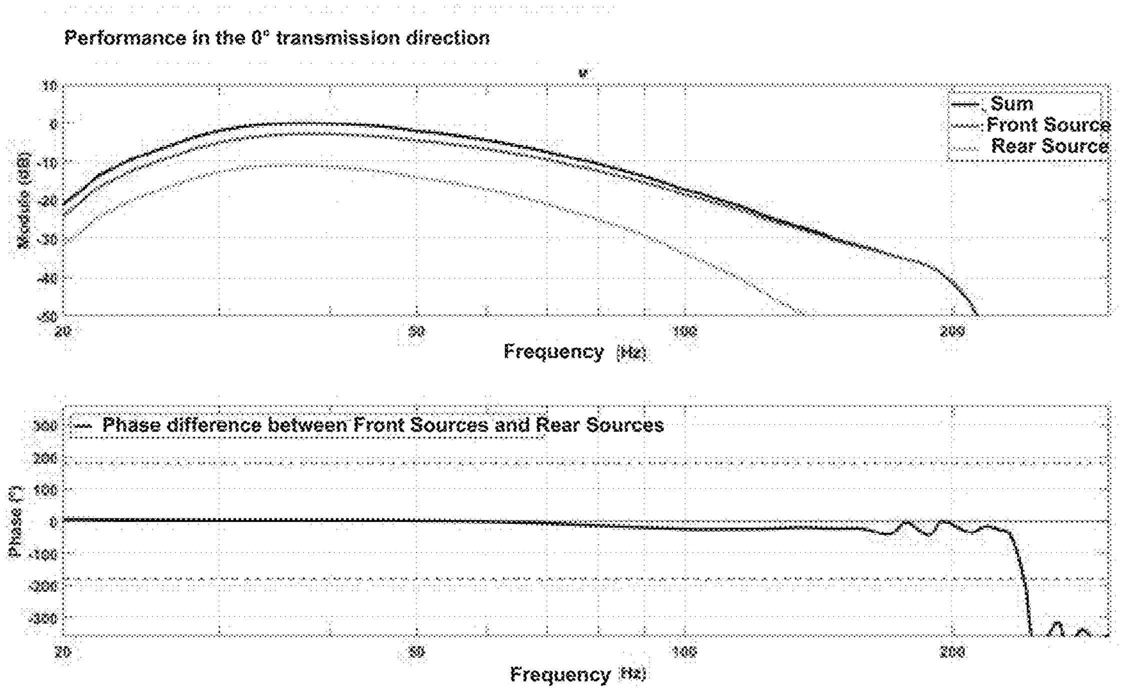

[Fig. 4D]
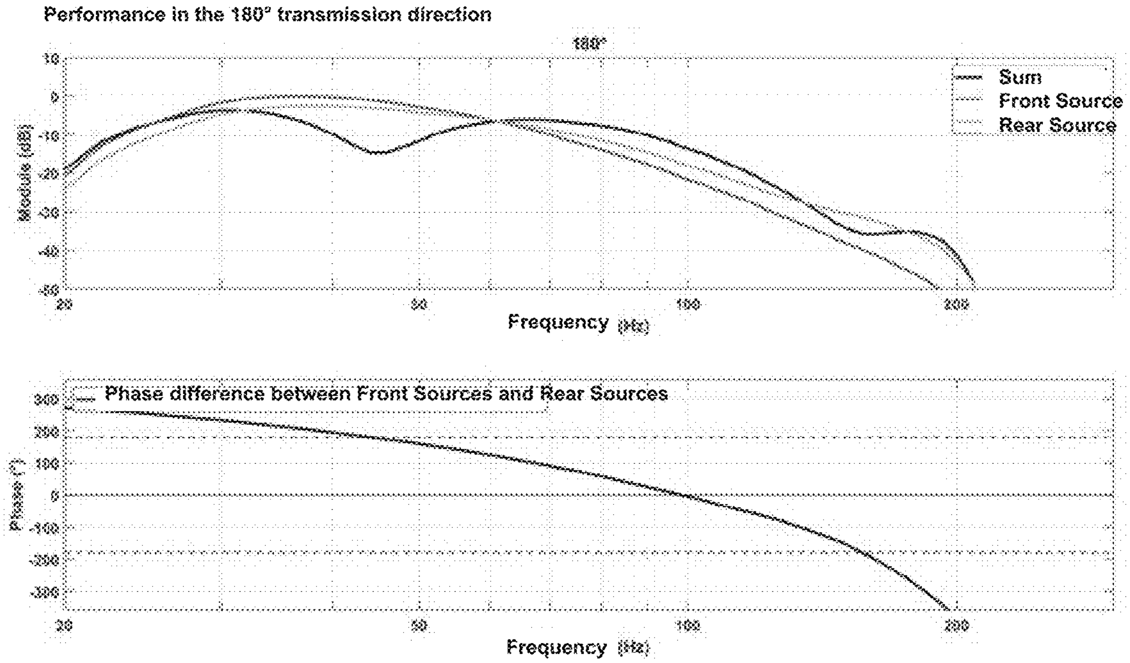
[Fig. 5A]
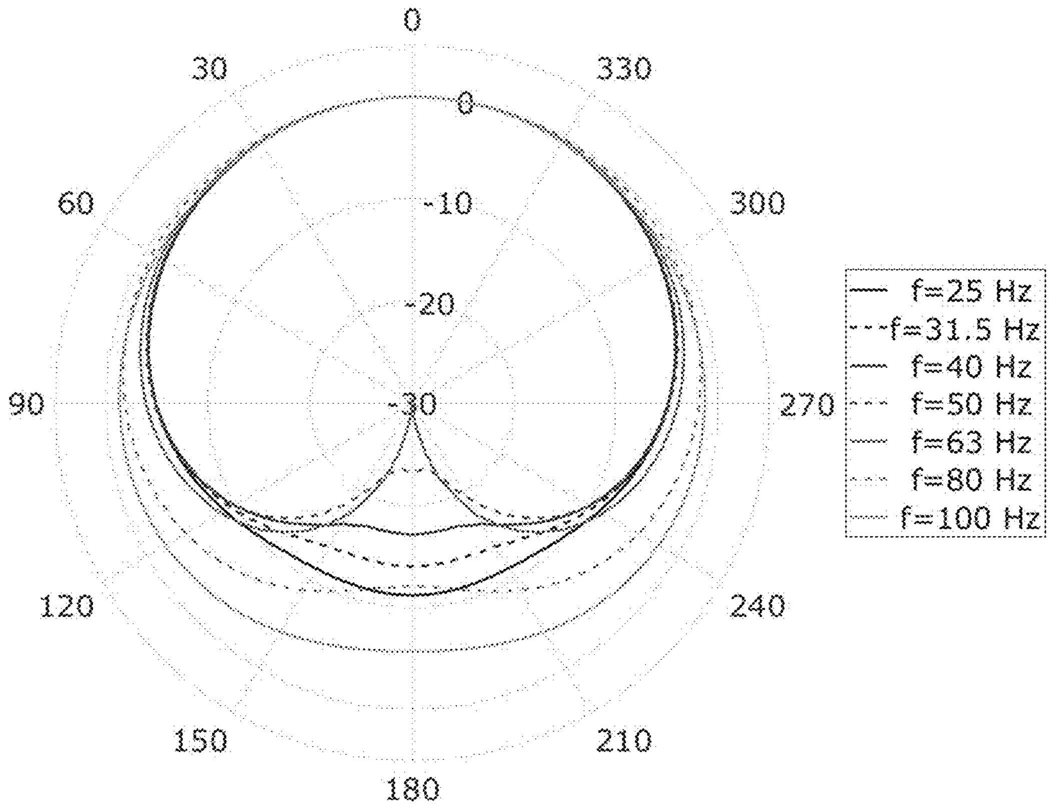

[Fig. 5B]
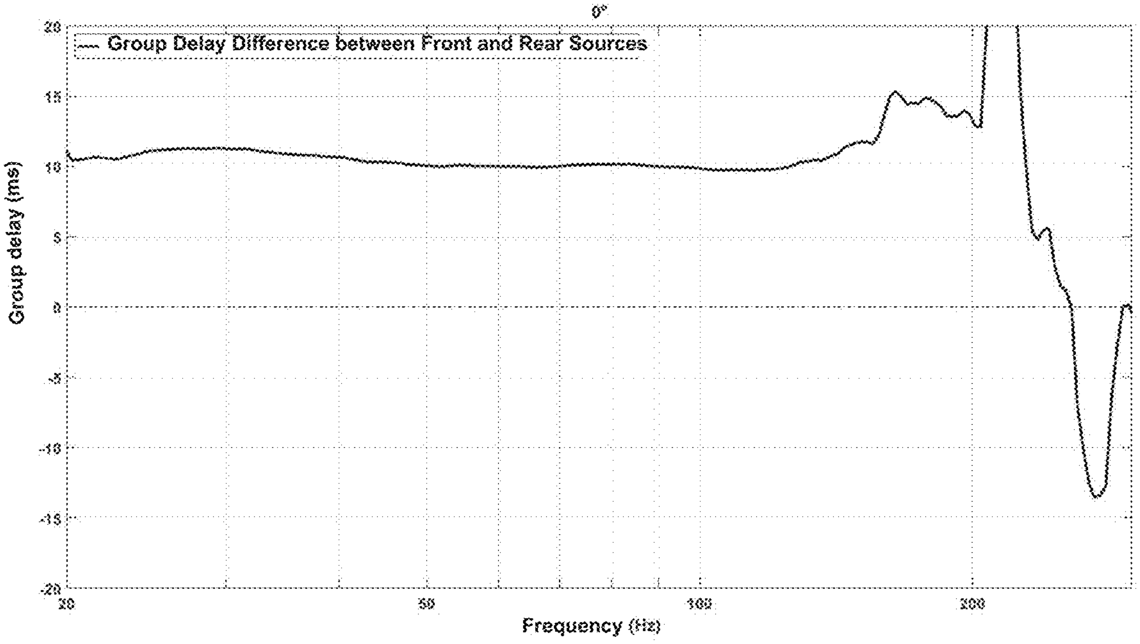
[Fig. 5C]
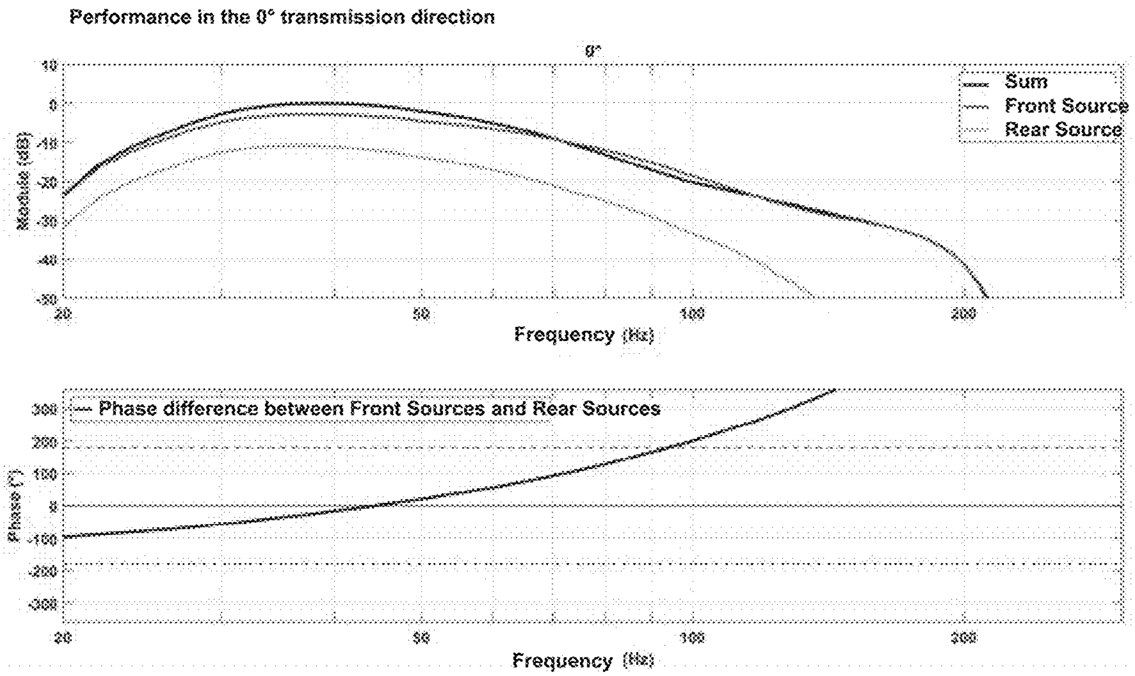

[Fig. 5D]
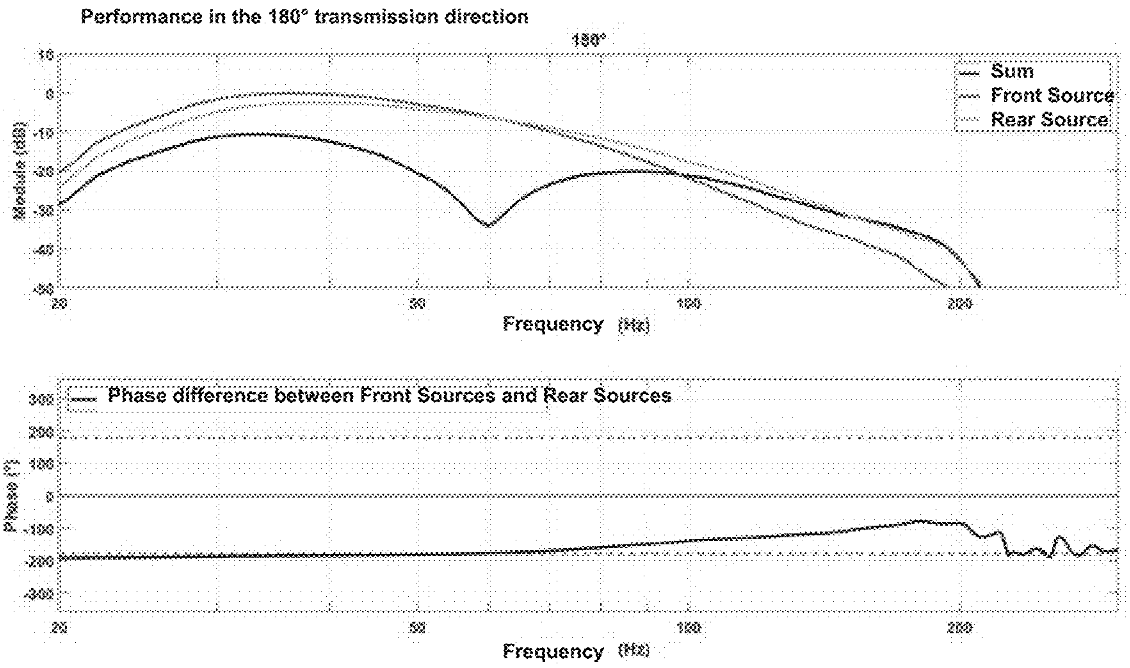
[Fig. 6A]
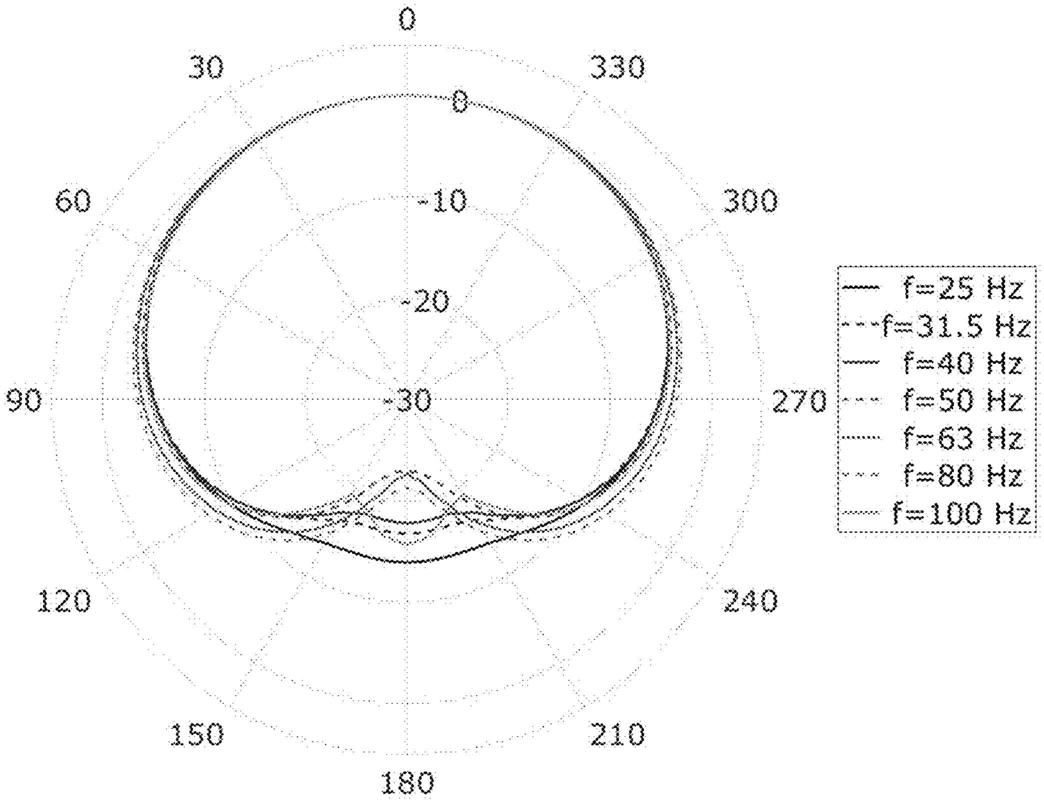

[Fig. 6B]
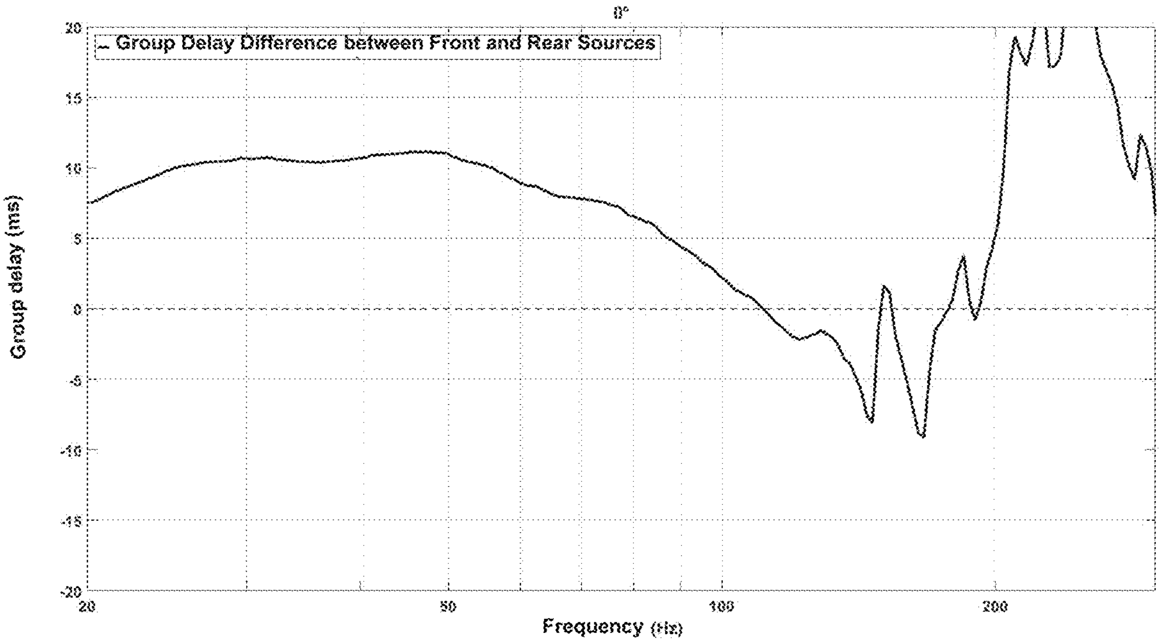
[Fig. 6C]
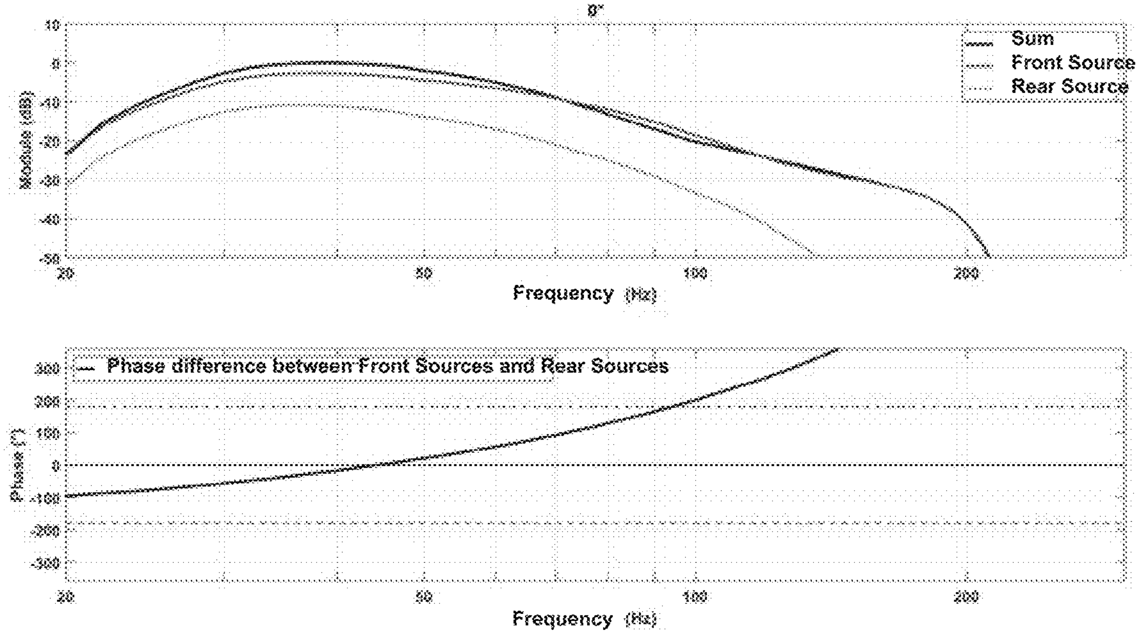

[Fig. 6D]
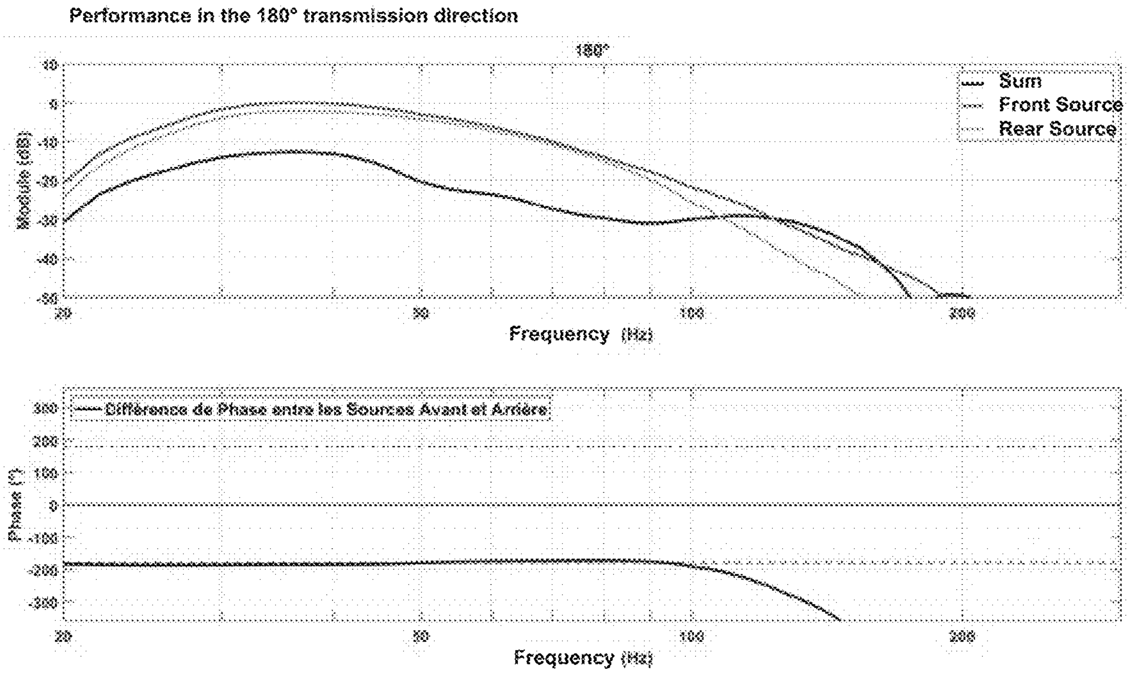
[Fig. 7]
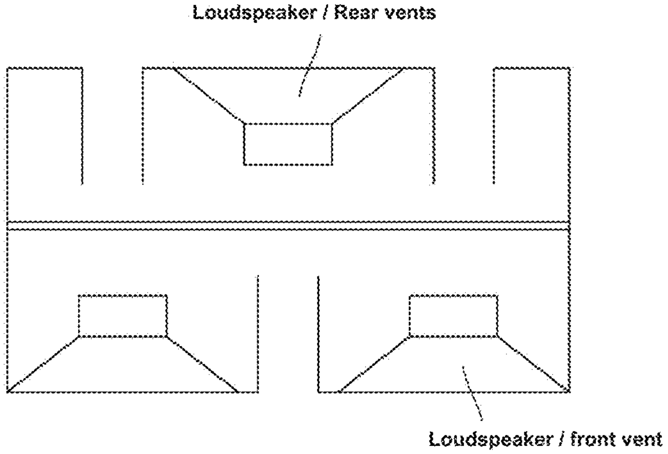

[Fig. 8]
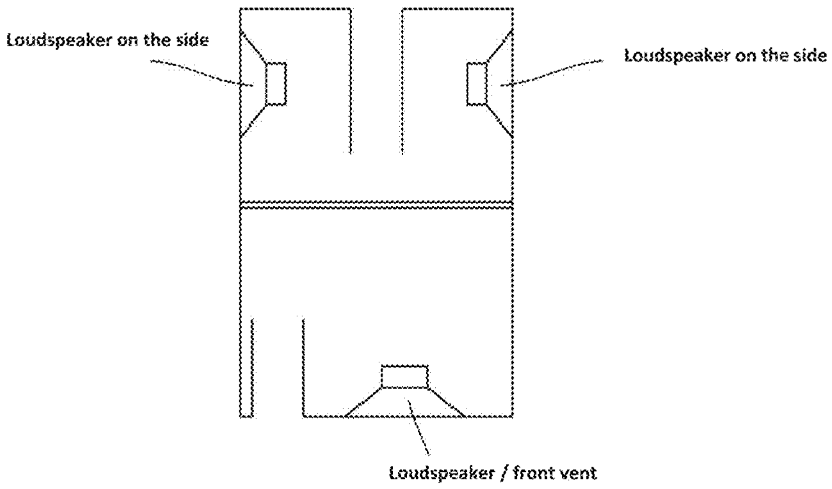
[Fig. 9A]
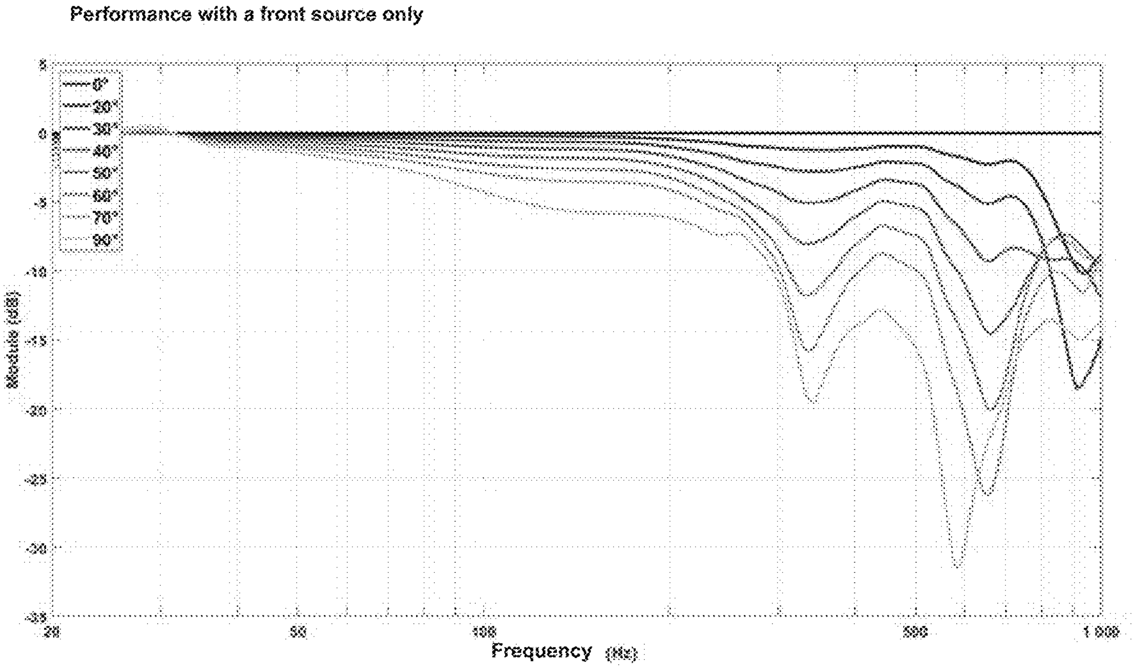

[Fig. 9B]
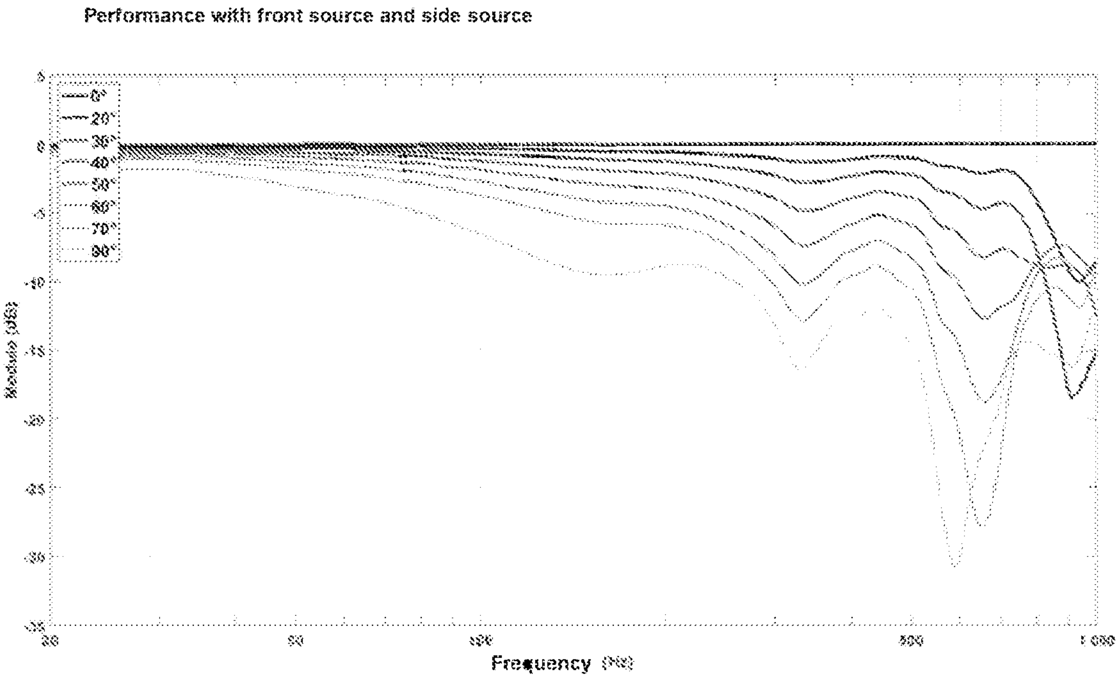
[Fig. 10]
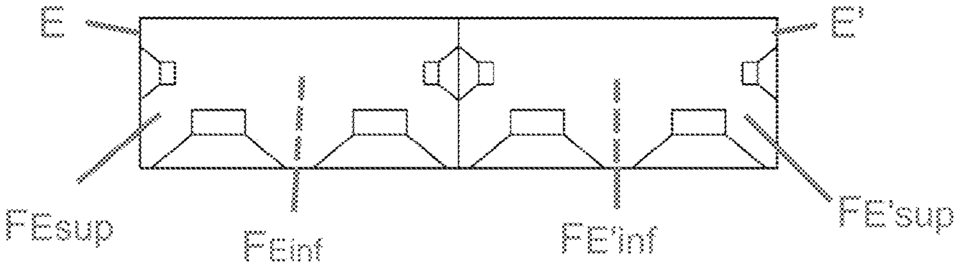

[Fig. 11A]
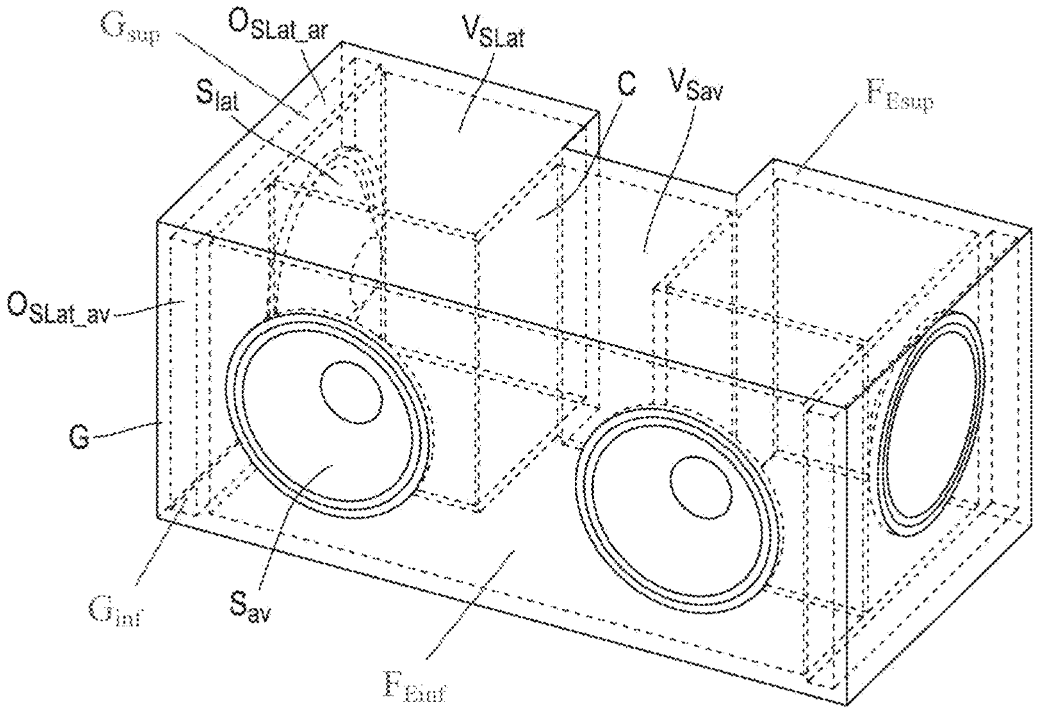
[Fig. 11B]
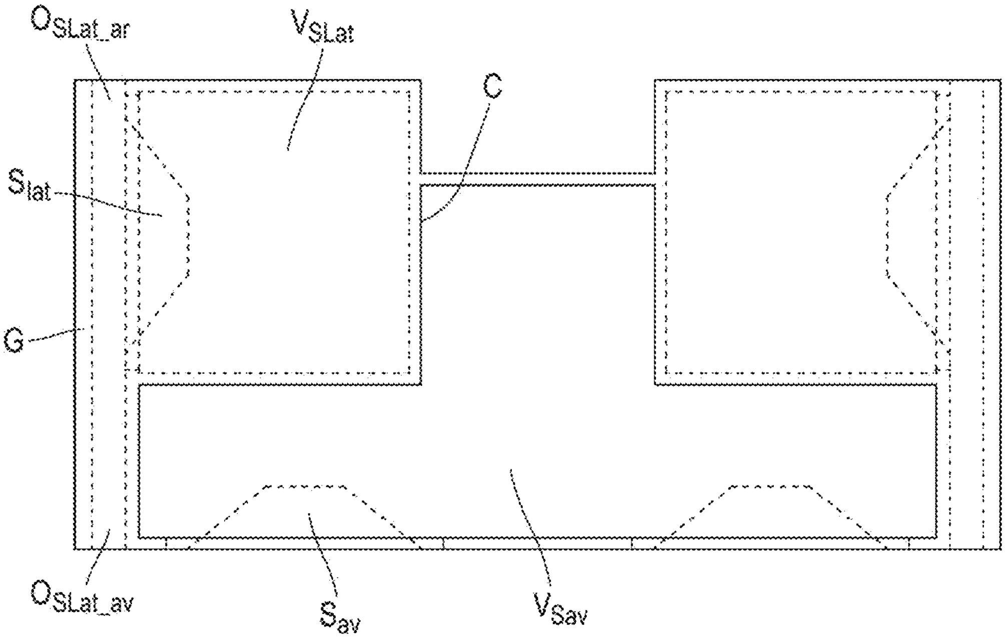

[Fig. 12]
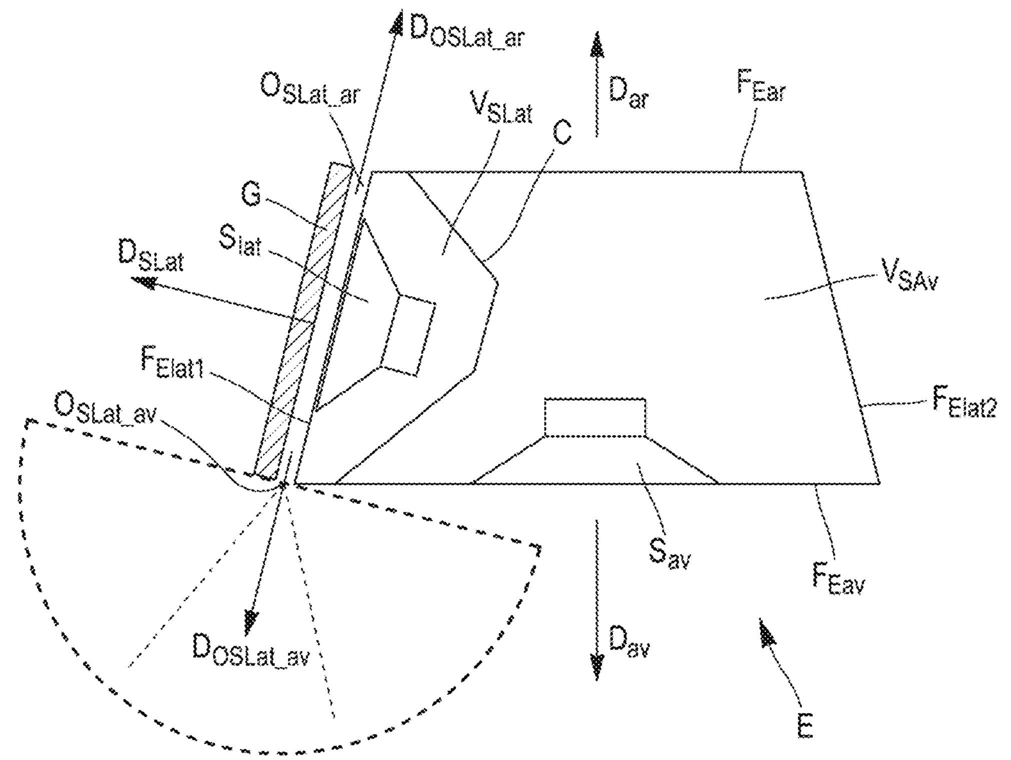
[Fig. 13A]
Without waveguide
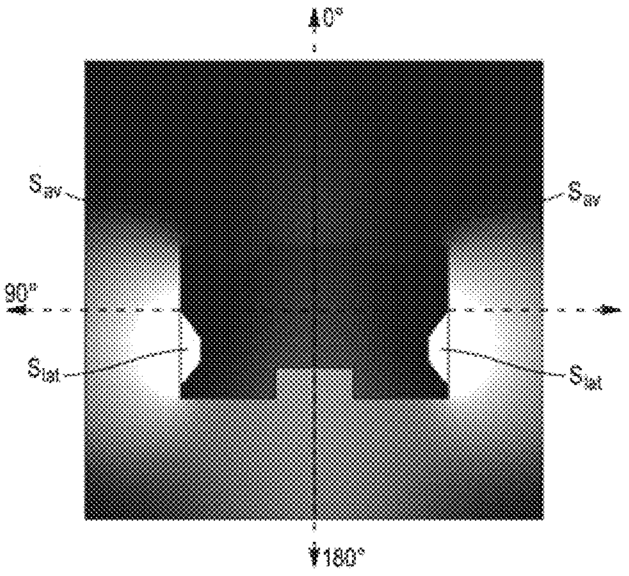

[Fig. 13B]
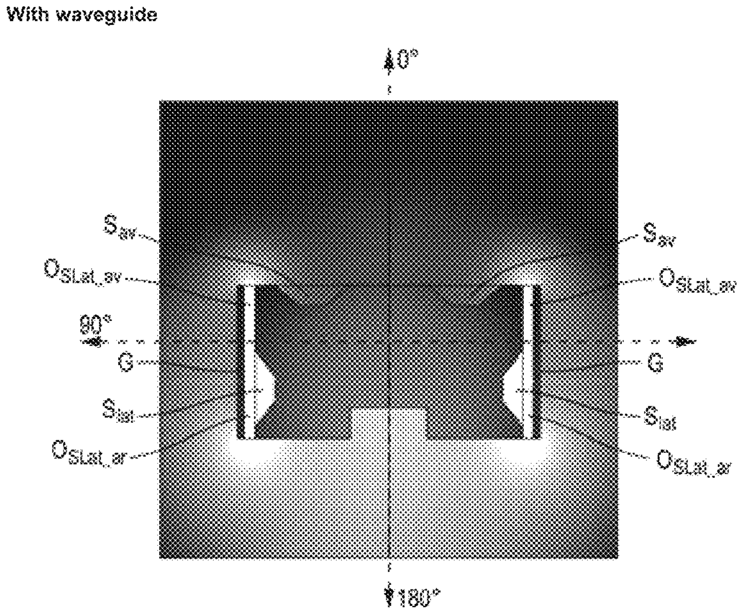
[Fig. 14A]
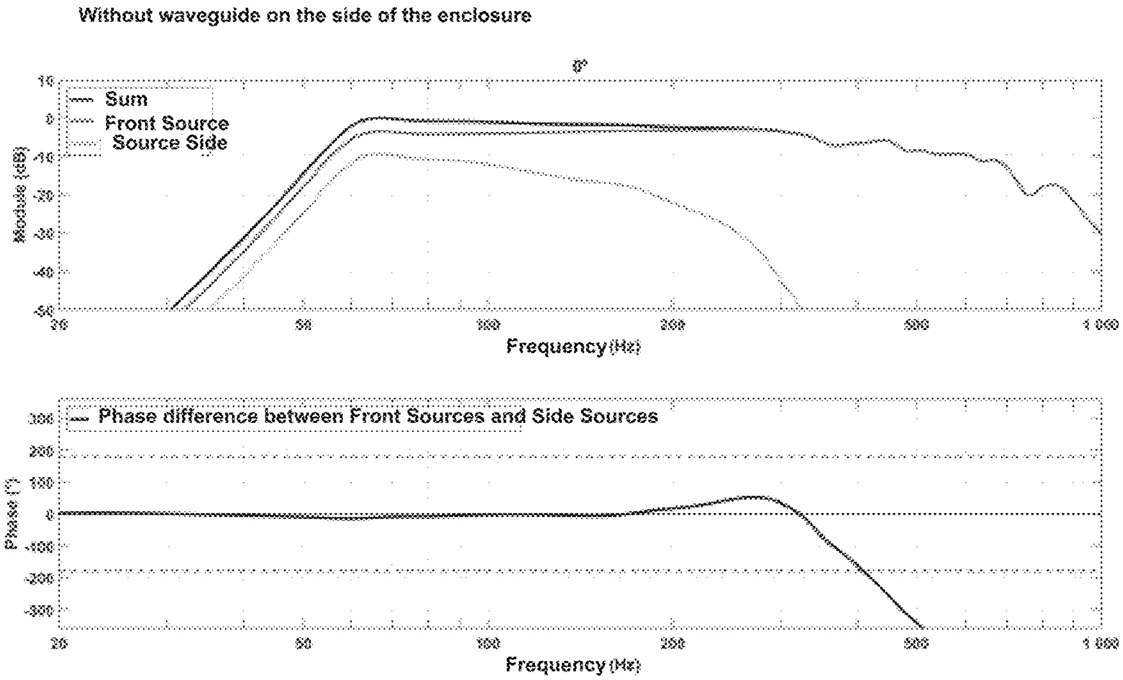

[Fig. 14B]
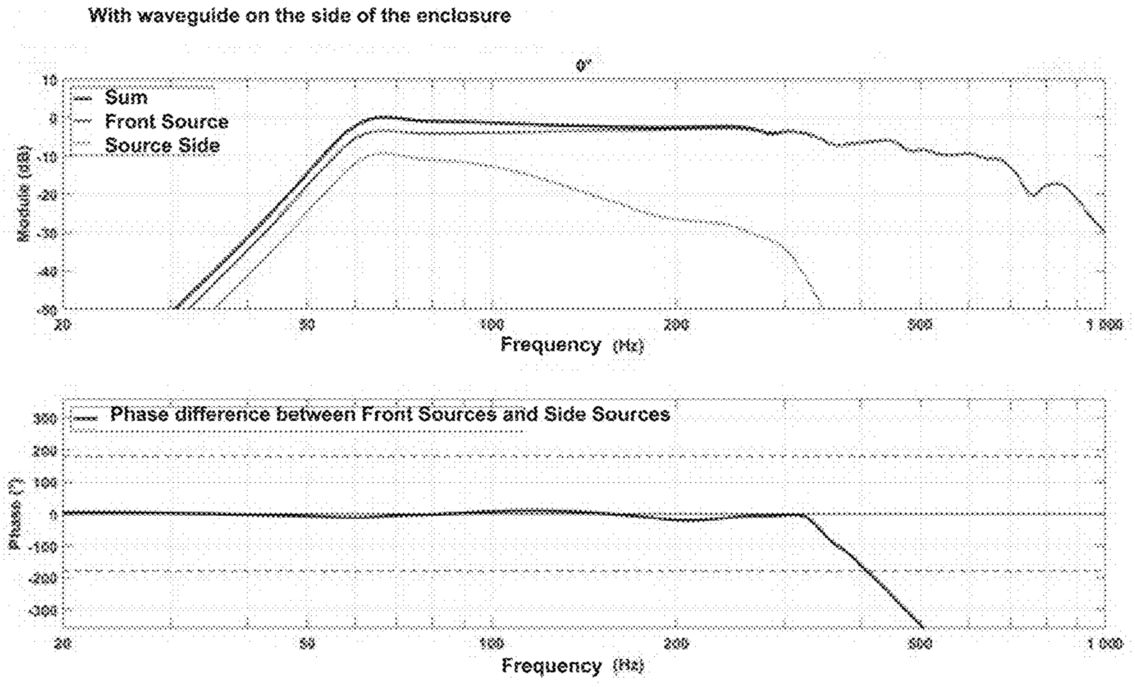
[Fig. 15A]
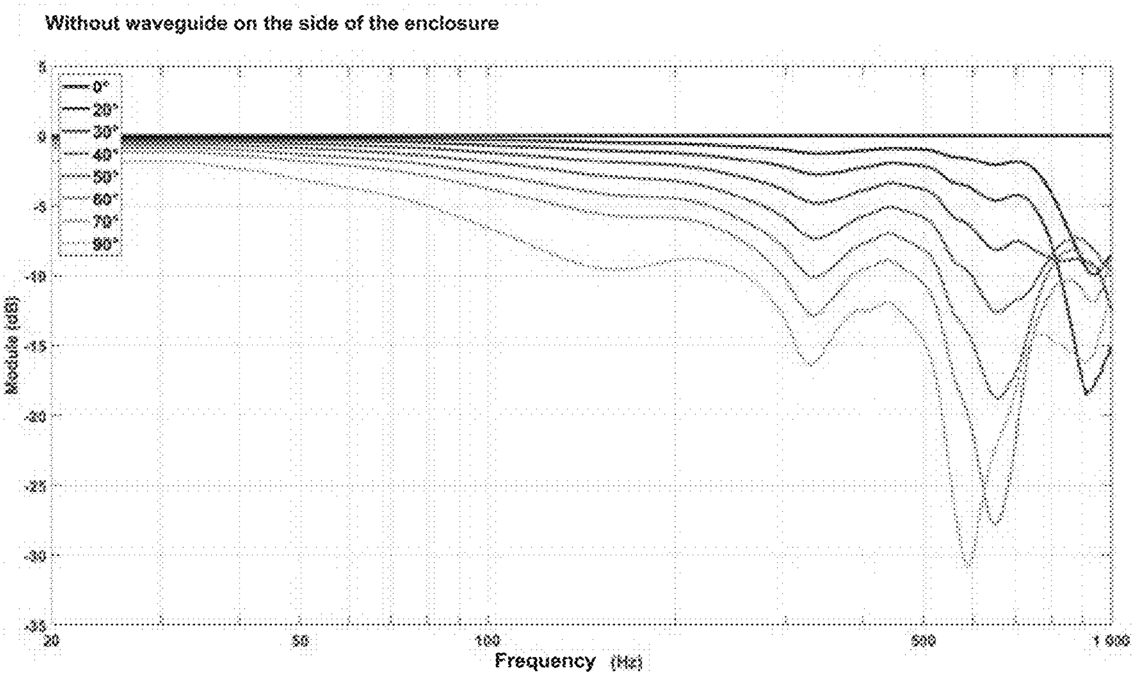

[Fig. 15B]
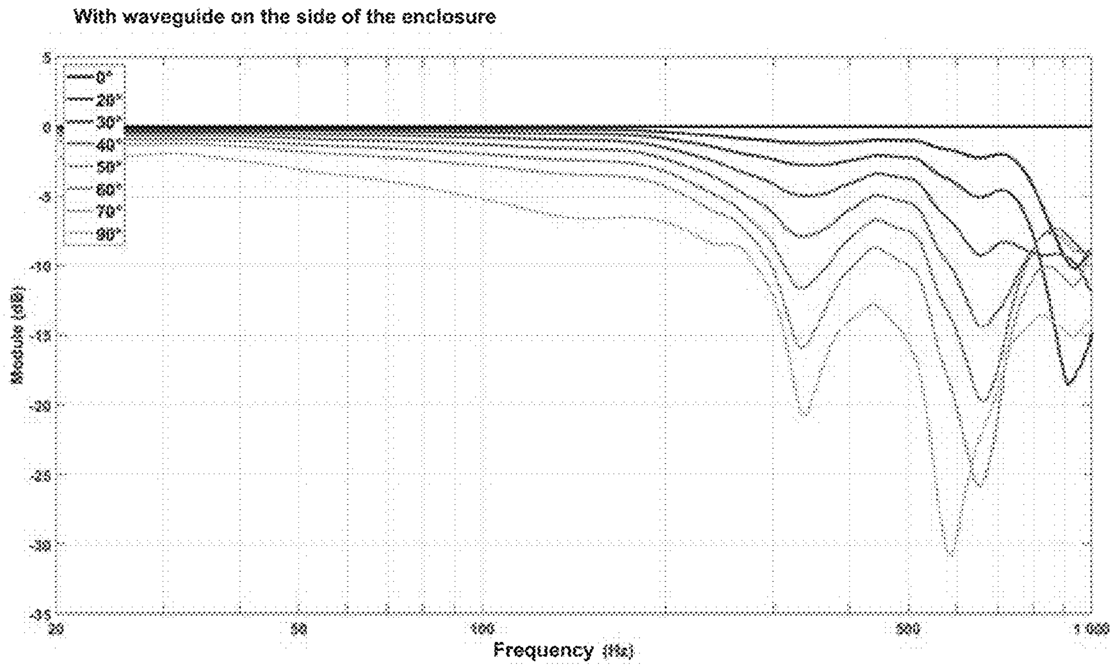
[Fig. 15C]
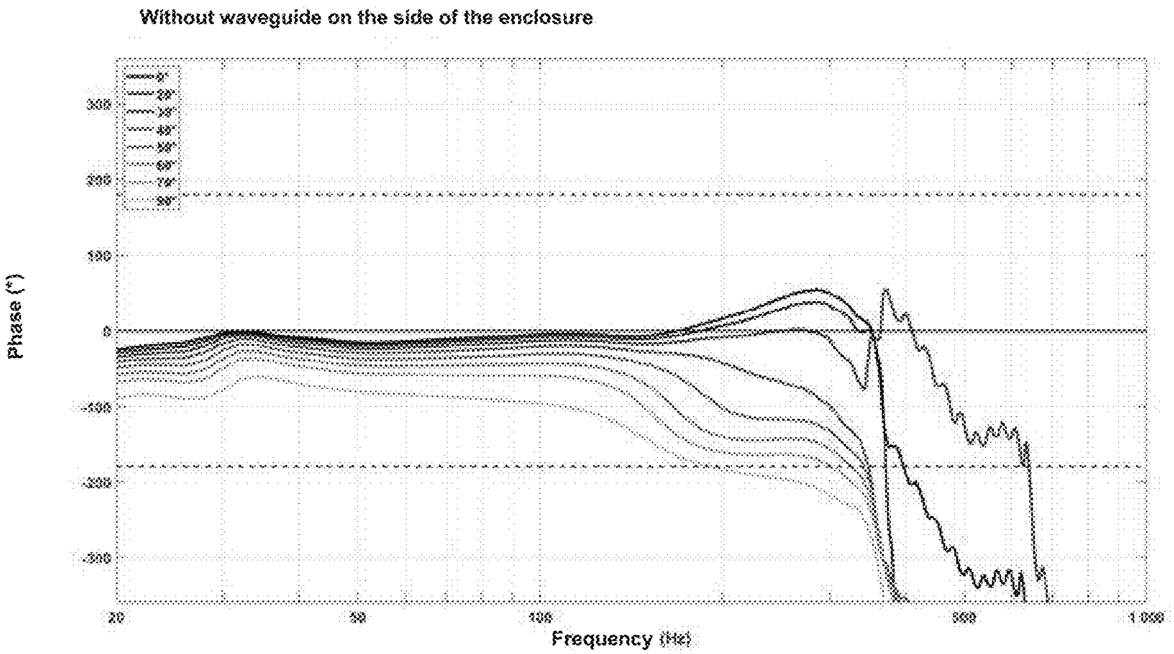

[Fig. 15D]
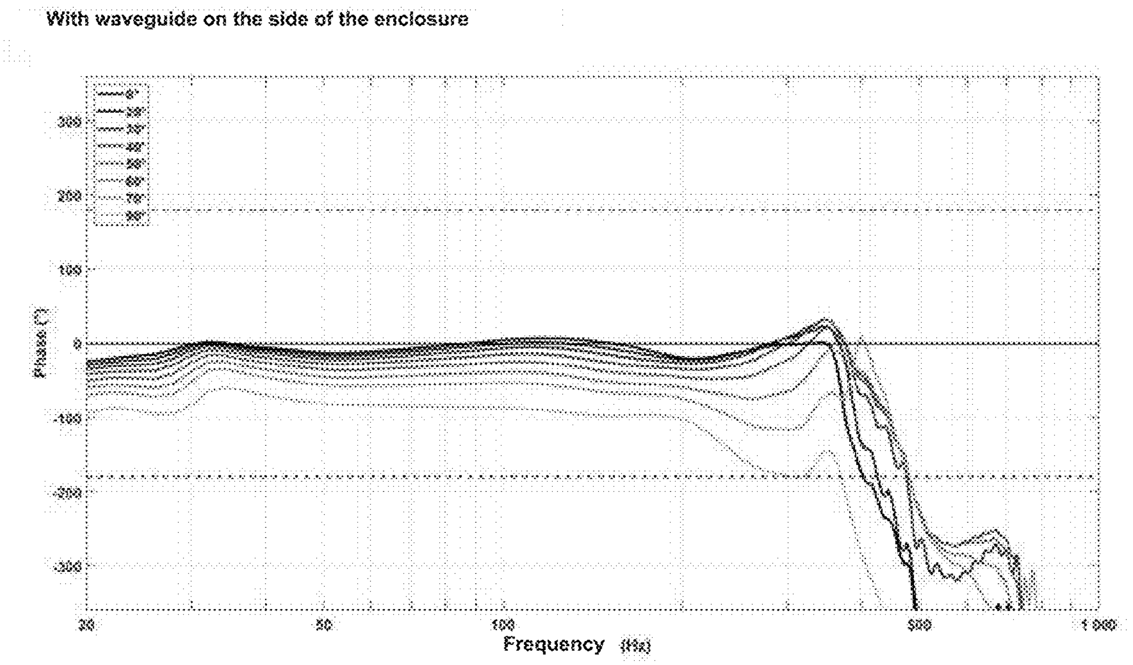
[Fig. 16A]
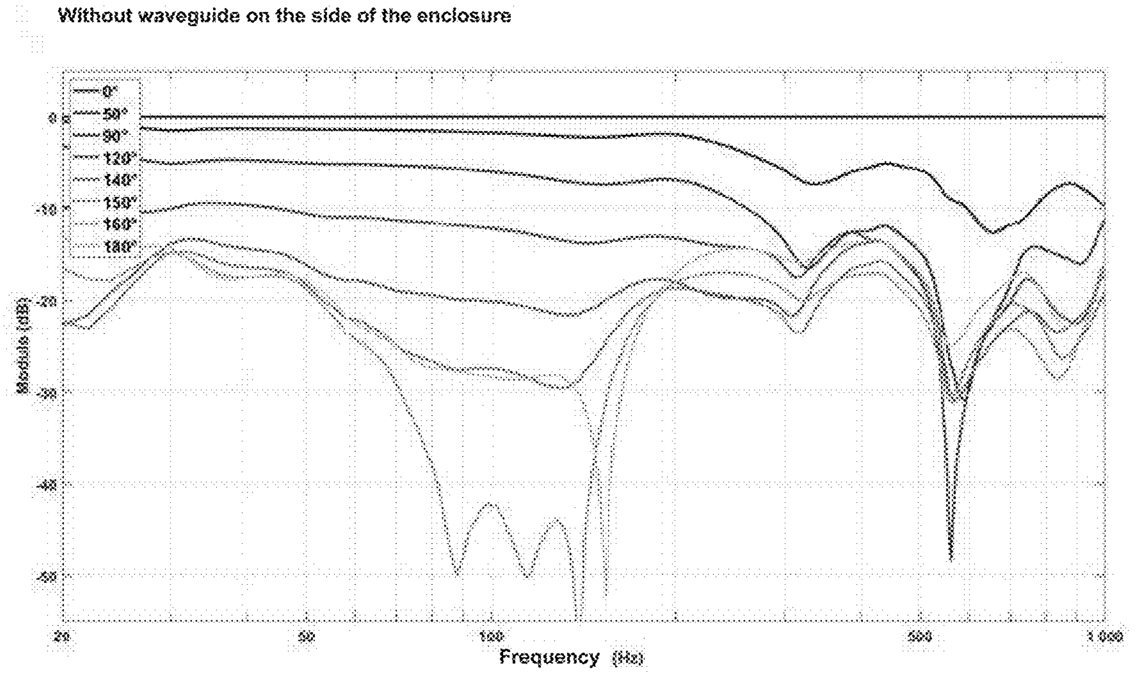

[Fig. 16B]
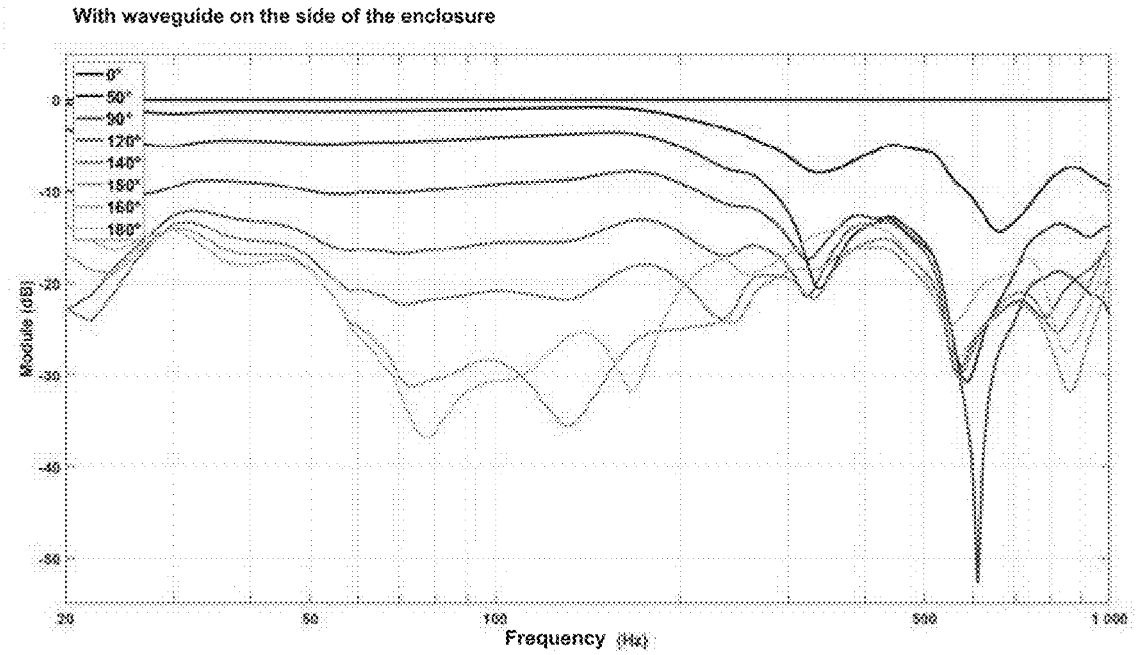
[Fig. 16C]
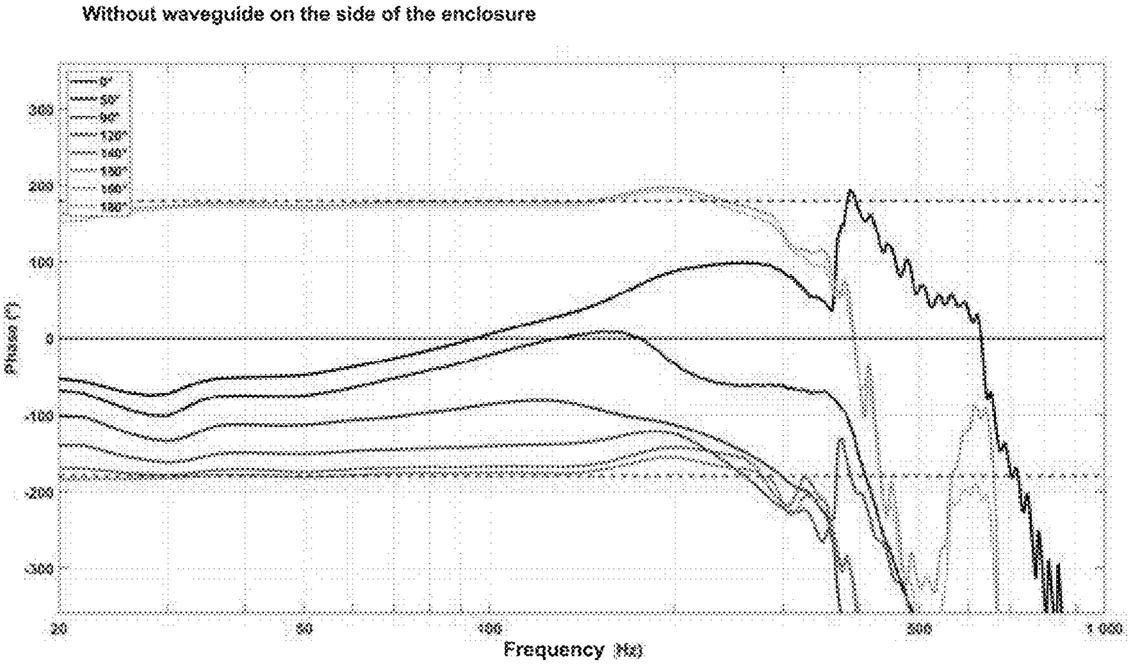

Fig. 16D]
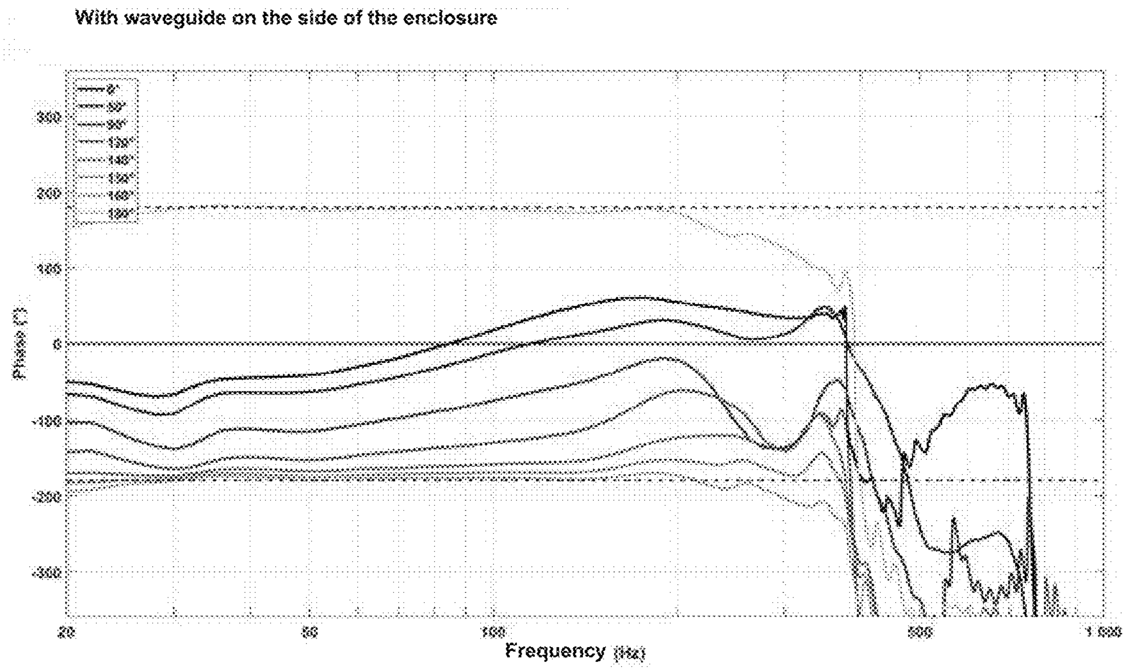

SOUND DIFFUSION DEVICE WITH CONTROLLED BROADBAND DIRECTIVITY

The present application relates to an acoustic enclosure with controlled broadband directivity.

STATE OF THE ART

The objectives of modern public address systems are to ensure:

- the homogeneity of the sound level over the audience area covered, and this over the entire audio spectrum (20 Hz-20 kHz), while avoiding generating sound levels outside this area,
- a high level of quality over the audience from the point of view of the coupling of the various components of the public address systems Sound diffusion devices emitting in the low frequencies, i.e. below 200 Hz, have very little directivity because their size is small compared to the wavelength generated by the sound sources.

To compensate for this emission, which can not only pollute areas to be avoided but can also excite the resonance modes of rooms and create disturbing reverberation on the audience, users and manufacturers of sound diffusion systems have invented electro-acoustic configurations that give sound devices a particular directivity, notably of the cardioid or hyper-cardioid type. FIG. 1 shows the polar radiation pattern for different directivity types.

More specifically, when using a public address system with several sound diffusion devices, an effective forward summation, i.e. in the direction of the 0° axis in FIG. 1, of the sound rays coming from the different sound diffusion devices and a rearward rejection, i.e. a cancellation of the sound at the rear of the public address system, in the direction of the 180° axis in FIG. 1, over a wide band of acoustic frequencies are sought. Summation of the sound radiation from the different devices means the superposition of these radiations, creating constructive or destructive zones. An effective summation is a solution where the superposition of the radiations creates constructive zones, i.e. where the radiations do not cancel each other out.

The physical phenomenon that, in the presence of several sound sources, the listener will perceive the emitted waves with a temporal difference induced by the difference in path between his position and those of each source, makes it possible to envisage the design of the particular directivities previously mentioned.

Electronic control of the amplitude and phase of the sound sources makes it possible to adapt the radiation pattern, and thus the directivity of the sound diffusion devices. In other words, by injecting different signals in phase as a function of frequency (a delay for example) to these different sources, it is possible to control the destructive or constructive zones resulting from the superposition of the sound flows of the plurality of sound sources used. The power ratio between each of these sources can also influence the effectiveness of the directivity induced by this setting.

Such directivities can be achieved by assembling products or by integrating new sound sources (loudspeakers, vents) within a product. An example of a product assembly might be a front-to-back alignment of two stacks of subwoofers, or a set of stacked and turned sources. A front-to-back alignment of two subwoofer stacks is shown in FIG. 2. A stacked and rotated source array is shown in FIG. 3. In this type of array, some sources are directed forward and others are directed backward.

In most cases, the physical configurations of products and/or components within a product are accompanied by individual electronic control (DSP) settings in magnitude and phase and for each frequency to achieve the directivity control function. However, depending on the DSP settings, the directivity control can be more or less localised in frequency. Furthermore, the summation of the different elements of the device from the front may be more or less optimal.

A first example of the state of the art is the design of a front-to-back alignment of two subwoofer stacks as shown in FIG. 2, electronically controlled by an "End Fire" setting. This control consists of electronically adding a time delay to the front stack, so that the waves from the front and rear stacks arrive at the same time in the front axis (the axis noted as 0°) so as not to deteriorate the quality of the perceived sound. For a user at the rear of the two-stack alignment, the wave from the front stack arrives with a delay that is the sum of the path difference to the rear stack and the electronically added delay. This delay can be optimised to produce a phase opposition between the two stacks at a specific sound frequency. The end result of this adjustment is a non-deterioration of the sound in the front, at the cost of a very localized frequency rejection in the rear. The performance of such a system is shown in FIGS. 4A to 4D: the phase difference curves show good sound quality at the front, i.e. the arrival in phase of the waves from the two stacks at the front (0° phase shift), as well as total rejection for a single frequency (1800 phase shift).

A second example of the state of the art is the design of a front-to-back alignment of two subwoofer stacks as shown in the FIG. 2 electronically controlled by a so-called "Gradient" control. This control involves adding an electronic delay to the rear stack so that the waves from the front and rear stacks arrive at the same time as seen from the rear, and adding a phase opposition to cancel the sound at the rear. FIGS. 5A to 5D illustrate the performance of such a system. Effective rejection over a wide frequency range is achieved, as shown by the phase difference curve between the front and rear stacks being 180°. However, for a user positioned at the front, in the 0° axis, the wave emitted by the rear stack arrives with a constant time delay. In the phase difference plot in the direction of the 0° axis, the misalignment of the two stacks can be observed over the entire frequency band, except for one frequency where the phase difference is zero. Also, the waves from the front and rear stacks are always shifted in time by a constant delay, which produces an echo that is detrimental to the quality of the signal perceived at the front.

A third example of the state of the art is the design of a front-to-back alignment of two stacks of subwoofers as shown in the FIG. 2, controlled electronically by an "all pass filter" setting. This electronic control acts like a filter introducing a delay that varies with the sound frequency. This adjustment allows a compromise to be made between rear rejection over a wide frequency band and efficient summation of the waves from the front and rear sources. The performance of such a system is illustrated in FIGS. 6A to 6D. The polar plots of the directivities at different frequencies are similar. Also, the phase difference curve at the rear (in the 1800 axis) shows a more constant phase opposition in frequency.

Physical configurations of stand-alone products have the advantage of offering flexibility to the user, who can adjust a physical configuration to meet a directivity and sound quality objective, but require a higher level of expertise than products that encapsulate the directivity and sound quality control function directly.

Some manufacturers therefore offer the integration of several electronically controlled sources in the enclosure. For example, some products have two driver/vent assemblies in the front and two driver/vent assemblies in the rear. An example of such a product is shown in FIG. 7. The disadvantage of this type of product with multiple sources at the front and rear is that for a listener positioned at the front of the loudspeaker, the phase and time alignment of the different sources is not good at the higher frequencies. This disadvantage may be acceptable for subwoofers but is no longer acceptable for products reproducing higher frequencies, especially above 60 Hz.

Thus, a solution known in the state of the art consists in manufacturing products with sound sources positioned more or less to the sides, in addition to sound sources positioned at the front, in order to reduce the propagation time of the rear sources, by reducing the distance between the sources. An example of such a product is shown in FIG. 8.

The disadvantages of this type of product configuration are, on the one hand, specific to the quality of the sound diffusion obtained. FIGS. 9A and 9B show the response curves in dB SPL (Sound Pressure Level) obtained in different listening directions of the front hemisphere of an acoustic enclosure defined by the main direction of emission of the acoustic enclosure, in a first configuration, with sound sources at the front in an acoustic enclosure and in a second configuration, with additional sources at the sides. The frequency curves show a faster decay of the directivity lobe to the sides in the second configuration with the additional sources to the sides, which produces an inhomogeneous diffusion over the whole audience.

The disadvantages of products with sound sources positioned more or less to the side are also mechanical. Products with sources positioned more or less to the side cannot be stacked to the side, or else at the cost of a loss of efficiency of the product, as illustrated in FIG. 10; with this type of product it is also difficult to create continuous arrays of products, nor to attach other objects to the product; finally, the lateral sources are visible from the outside.

The present invention aims to overcome the drawbacks of the state of the art, and in particular to improve the directivity quality of product configurations comprising front and side sources.

The invention thus concerns a sound enclosure having a volumetric shape with a front face, a rear face, and two first and second lateral faces. The said enclosure has a main emission direction perpendicular to the front face of the acoustic enclosure and a rear emission direction perpendicular to the rear face of the acoustic enclosure. Said enclosure comprises:

- at least one front acoustic source configured to emit through the front face and having a front source main emission direction, said front source main emission direction being substantially equal to the main emission direction of the acoustic enclosure,
- at least one lateral acoustic source oriented towards at least one source lateral face, said source lateral face being one and/or the other of the two first and second lateral faces, at least one lateral acoustic source oriented towards at least one lateral source face, said lateral source face being one and/or the other of the two first and second lateral faces, said lateral acoustic source having a main lateral source emission direction substantially perpendicular to one and/or the other of the first and second lateral faces,
- at least one sound waveguide, said waveguide being positioned in front of the at least one lateral acoustic source so as to occlude the sound flux emitted by said lateral acoustic source in the main lateral source emission direction said waveguide being positioned in front of the at least one lateral acoustic source so as to block the sound flux emitted from said lateral acoustic source in the main lateral source emission direction, and to direct the sound flux emitted from said lateral acoustic source to two first and second pluralities of lateral directions on either side of the main lateral source emission direction, and said waveguide being joined to said lateral face with source by joining means,
- at least one front orifice formed by a space between said lateral face with source and said sound waveguide, so as to allow the sound flow emitted by said lateral acoustic source to pass in directions pointing towards a hemisphere defined by the main emission direction of the enclosure,
- at least one rear orifice formed by a space between said lateral face with source and said sound waveguide, so as to allow the sound flow emitted by said lateral acoustic source to pass in directions pointing towards a hemisphere defined by the rear emission direction of the enclosure;
- means for occluding the sound flux reflected by said at least one waveguide in directions other than the directions in which said at least one front orifice and at least one read orifice let said sound flux pass, with the aim of increasing the flux emitted by these orifices.

Advantageously, the at least one front acoustic source is located in a front volume.

In this case, advantageously, the at least one lateral acoustic source is located in a lateral volume separate from the front volume.

In one or more embodiments, the at least one front acoustic source and the at least one lateral acoustic source are working in substantially a same frequency range.

In one or more embodiments, said front acoustic source and said lateral acoustic source are acoustic sources both working substantially in a low frequency range and/or in a medium frequency range.

In one or more embodiments, the at least one front acoustic source and the at least one lateral acoustic source are configured to be individually driven by DSP and amplifier channels and electronically controlled in amplitude and phase so as to control the directivity of the sound radiation from the acoustic enclosure.

In one or more embodiments, the acoustic enclosure according to the invention is adapted to be stacked with a second acoustic enclosure according to the invention. The acoustic enclosure and the second acoustic enclosure each further comprise a first upper side and a first lower side, and a second upper side and a second lower side, respectively. The acoustic enclosure may be stacked with the second acoustic enclosure from below, from above, or from the side.

In one or more embodiments, the acoustic enclosure according to the invention is of the bass reflex type, and also comprises at least one vent associated with the at least one lateral acoustic source. By bass reflex type acoustic enclosure, we mean an enclosure provided with one or more vents also called resonators. In these cases, the at least one vent is positioned on the rear face of the acoustic enclosure.

In one or more embodiments, said means occluding the sound flow connect the lateral face with source and said sound waveguide in a solid and continuous manner on an upper side and a lower side of the sound enclosure (E).

Further advantages and features of the present invention will result from the following description, given as a non-limiting example and made with reference to the attached figures:

FIG. 1, already described, illustrates the radiation diagram in polar coordinates corresponding to different types of sound directivities.

FIG. 2, already described, shows a front-rear alignment of two subwoofer stacks.

FIG. 3, already described, shows a stacked-returned source array.

FIGS. 4A to 4D, already described, show the acoustic performance of a state-of-the-art sound diffusion system comprising two stacks of sound sources aligned one behind the other, controlled by an electronic "End Fire" type control.

FIGS. 5A to 5D, already described, show the acoustic performance of a state-of-the-art sound diffusion system comprising two stacks of sound sources aligned one behind the other, controlled by a "Gradient" type electronic control.

FIGS. 6A to 6D, already described, show the acoustic performance of a state-of-the-art sound diffusion system comprising two stacks of sound sources aligned one behind the other, controlled by an electronic "All Pass Filter" type control.

FIG. 7, already described, shows a top view of the geometry of an acoustic enclosure comprising sound sources at the front and rear of the acoustic enclosure.

FIG. 8, already described, shows the geometry of an acoustic enclosure with sound sources at the front and additional sound sources positioned more or less to the sides of the acoustic enclosure in top view.

FIGS. 9A and 9B, already described, show a comparison of the performance of a loudspeaker with front sources only, with that of an acoustic enclosure with sources positioned more or less to the sides of acoustic enclosures in addition to the front sources.

FIG. 10, already described, illustrates schematically the stacking from the side of acoustic enclosures with additional sources on the sides of the acoustic enclosures.

FIGS. 11A and 11B show a three-dimensional view and a two-dimensional top view, respectively, of a digital model of an acoustic enclosures according to the invention.

FIG. 12 shows a top view of a schematic diagram of another type of acoustic enclosure according to the invention.

FIGS. 13A and 13B show two maps of the SPL value of an acoustic enclosure without and with a sound waveguide.

FIGS. 14A and 14B show a comparison of the performance in terms of phase difference and magnitude, as a function of sound frequency, of an enclosure E without and with a sound waveguide.

FIGS. 15A to 15D show the performance of a sound enclosure E with a waveguide electronically controlled in amplitude and phase according to a first type of electronic control.

FIGS. 16A to 16D show the performance of an electronically amplitude and phase controlled acoustic enclosure E according to a second type of electronic control.

FIGS. 11A-B to 16A-D are discussed in more detail in the following detailed description and examples, which illustrate the invention without limiting its scope.

DETAILED DESCRIPTION

FIGS. 11A and 11B show a three-dimensional view and a top view of an acoustic enclosure E according to the invention. By acoustic enclosure, we mean an enclosure comprising one or more acoustic sources, allowing the reproduction of sound from an electrical signal supplied by an audio amplifier. The acoustic enclosure E has a volumetric shape defining an area inside and an area outside the enclosure, hereinafter referred to as the inside and outside of the enclosure, with a front face FEav, a rear face FEar, and two first and second lateral faces FElat1 and FElat2 as well as an upper side FEsup and a lower side FEinf. In the case of figures A11 and B, this is a parallelepiped. The enclosure could take any other volumetric shape such as an extruded trapezoid, where the first and second lateral faces FElat1 and FElat2 are not perpendicular to the front face FEav of the acoustic enclosure E, as shown in FIG. 12.

The acoustic enclosure E has a main direction of emission Day perpendicular to the front side FEav directed towards the outside of the acoustic enclosure E, as well as a rear direction of emission Dar perpendicular to the rear side FEar directed towards the outside of the acoustic enclosure E. In the following, the main direction of emission of the acoustic enclosure E will be referred to as Day or the 0° axis of emission.

The acoustic enclosure E comprises at least one front acoustic source Say configured to emit a sound stream through the front face FEav. The at least one front acoustic source Say has a main front source emission direction DSav that is substantially equal to the main emission direction Day of the acoustic enclosure E.

The acoustic enclosure E also comprises at least one lateral acoustic source Slat oriented towards at least one lateral face with source FElat which corresponds to one and/or the other of the two first and second lateral faces FElat1 and FElat2 of the enclosure. The at least one lateral acoustic source Slat has a main lateral source emission direction DSlat substantially perpendicular to one and/or the other of the lateral faces FElat1 and FElat2 and directed towards the outside of the acoustic enclosure E.

In one or more embodiments, said front acoustic sources and lateral acoustic sources can be separated in different volumes, respectively front volume VSav and lateral volume VSLat, materialized by partitions C inside the acoustic enclosure E. The fact of providing distinct volumes for the at least one front acoustic source Say and the at least one lateral acoustic source Slat allows distributing a differentiated signal to these enclosures so as to control the directivity of the radiation. An example of these embodiments is visible in FIG. 12. Such volumes make it possible to obtain a better quality of diffusion because they separate sound diffusion spaces in which the sound signals sent, respectively to the said front acoustic sources and lateral acoustic sources, are different. These volumes can thus attenuate possible undesired effects that degrade the diffusion quality of the complete acoustic enclosure, such as interference. Several configurations are possible: for example, in the case of the existence of several front acoustic sources, each of them may be located in a separate volume, or several may be grouped together in the same volume; similarly, in the case of the existence of several lateral acoustic sources, each of them may be located in a separate volume, or several may be grouped together in the same volume.

Although FIGS. 11A and 11B present a symmetric acoustic enclosure provided with two front acoustic sources and two lateral acoustic sources, the directivity effect can be obtained with a single front acoustic source and a single lateral acoustic source, as illustrated by FIG. 12.

The acoustic enclosure E also comprises at least one sound waveguide G. By sound waveguide is meant a physical device capable of directing the flow of an incident sound wave onto this device. The sound waveguide G may, for example, take the form of a simple wall, or any other three-dimensional shape designed to guide the flow of sound meeting the waveguide G in determined directions. The waveguide may, for example, be designed to converge, or diverge, the sound flow incident on it.

The waveguide G according to the invention is positioned in front of the at least one lateral acoustic source Slat so as to occlude the sound flux Flat emitted by the at least one lateral acoustic source Slat in the main lateral source emission direction DSlat, and to direct the sound flux Flat towards two first and second pluralities of lateral directions DSlat1 and DSlat2 on either side of the main lateral source emission direction DSlat. By the terms first and second pluralities of lateral directions are meant directions oriented respectively towards each of the half-spaces separated by the main lateral source emission direction DSlat. The waveguide G is assembled to said lateral face with source FElat by assembly means. The waveguide G has an outer face and an inner face.

The acoustic enclosure E also has at least one front opening OSLat_av formed by a gap between the inner face of the sound waveguide G and a first inner partition of the acoustic enclosure E, so as to allow the sound flow Flat emitted by the acoustic source Slat to pass in directions towards a hemisphere defined by the main emission direction Day. FIGS. 11A-B and 12 show such a front opening OSLat_av.

Preferably, the front orifice OSLat_av allows the sound flow Flat from the at least one acoustic source Slat to pass in directions included in a hemisphere defined by a direction DOSLatav of the enclosure E determined by the front orifice OSLat_av. Advantageously, the front orifice OSlat_av allows the sound flow Flat of the at least one acoustic source Slat to pass in directions included in a cone with an axis parallel to the direction DOSLat_av of the enclosure and with an opening half angle of 30°. Other arrangements are possible, in particular involving different opening angles.

The acoustic enclosure E also has at least one rear opening OSLat_ar formed by a gap between the inner face of the sound waveguide G and a second inner partition of the acoustic enclosure E, so as to allow the sound flow (Flat) emitted by the acoustic source Slat to pass in directions towards a hemisphere defined by the rear emission direction Dar. FIGS. 11A-B and 12 show such a rear opening OSLat_ar.

Preferably, the rear orifice OSLat_ar allows the sound flow Flat emitted by the at least one acoustic source Slat to pass in directions included in a hemisphere defined by a direction DSlat_ar of the acoustic enclosure E determined by the rear orifice OSlat_ar. Other arrangements are possible, in particular involving different opening angles.

Thus, the enclosure E according to the invention with at least one sound waveguide G and at least one front opening OSLat_av and at least one rear opening OSLat_ar represents a new modified emissive part, compared to a sound enclosure without waveguide.

According to one embodiment, the acoustic enclosure E comprises occluding means to limit or eliminate the diffusion of the sound flux in directions other than the privileged directions defined by the at least one front orifice OSlat_av and rear orifice OSlat_ar.

According to a specific embodiment, these means can be specially designed to reflect the sound flux towards the orifices and thus increase the sound flux emitted through these orifices and reinforce the sought-after cardioid directivity effect.

According to a specific embodiment, the means can comprise the internal wall of the upper face FEsup and the internal wall of the lower face FEinf. These internal walls can be provided solid and continuous at the level of the space formed by the internal side of the wave guide the lateral face or faces with source of the acoustic enclosure (E). In the frame of the example illustrated by the references Gsup and Ginf in FIG. 11A, this is obtained by extension of the upper and lower walls of the acoustic enclosure, moreover enabling fastening of the wave guide G. These walls thus occlude the sound flux Flat reflected by the acoustic wave guide G in directions perpendicular on one hand to the direction of emission of the main direction of emission of the lateral acoustic source Dslat and on the other hand to the upper face FEsup and the lower face FEinf, meaning in the frame of the present example, the top and the bottom of the acoustic enclosure. Thus, there is no other orifice by which the sound flux can escape than the at least one front orifice OSlat_av and the at least one rear orifice OSlat_ar.

Other structures can be provided for implementation of the means, in particular occluding elements independent of the upper and lower walls of the acoustic enclosure E, for example in the form of added parts.

According to an embodiment, the acoustic enclosure E may have symmetry with respect to a plane corresponding to the median plane of the front face FEav of the enclosure E. In this case, the enclosure E has a first plurality of acoustic sources Slat1 oriented towards the lateral face FElat1 of the enclosure, and a second plurality of acoustic sources Slat2 identical to the plurality of acoustic sources Slat1 and positioned symmetrically with respect to the plane corresponding to the median plane of the front face FEav of the enclosure E, thus oriented towards the lateral face FElat2 of the enclosure E.

FIGS. 13A and 13B show the comparison of a top view mapping of the SPL value (dB response) of an acoustic enclosure E without a waveguide, with a mapping of the same enclosure E with a waveguide. These maps are derived from numerical simulations obtained with the COMSOL Multiphysics software commercialised by the COMSOL company. The simulations are based on the finite element method. The brightest areas correspond to areas with high SPL values, while the darkest areas correspond to areas with low SPL values. The waveguide is formed by a flat wall joined to the source side (FElat) of the enclosure. The enclosure has several sources at the front (drivers and vents) and acoustic sources at the sides (drivers). It can be observed that with the waveguide, the sound flow on the right side of the enclosure is decreased, compared to the mapping of the enclosure without waveguide G. Furthermore, the sound level is increased at the rear port.

FIGS. 14A and 14B show a comparison of the performance in terms of modulus and phase difference between the front sources and the sources on the sides of the loudspeaker E previously shown in FIGS. 11A and 11B, as a function of frequency. The curves correspond to a listening direction in the 0° axis, i.e. towards the front, and therefore towards the audience. A better minimisation of the phase difference can be observed in the frequency range between 180 Hz and 310 Hz, which corresponds to a better summation of the waves emitted by the set formed by the front sources and the sources on the sides.

An arbitrary split, but commonly used in the area, splits the sound spectrum covering at least partially the spectrum audible by humans (i.e. 20 Hz to 20 KHz) into three or four frequency bands, A high frequency or HF band covers the highest frequencies, corresponding to so called high-pitched sounds, typically in an interval substantially comprised between 1 KHz and 20 KHz. A medium frequency band, or MF band, covers intermediate frequencies typically in an interval between 200 Hz and 1 KHz. A low-frequency band, or BF band, covers low frequencies corresponding to bass sounds, typically frequencies in an interval substantially comprised between 60 Hz and 200 Hz. Lastly, a very low frequency band corresponding to sub-bass or infra-bass sounds, or TBF band, covers the interval of frequencies substantially comprised between 0 Hz and 60 Hz. In practice, a same component can be used to render signals in the BF and MF bands. In general, an acoustic source can emit over several frequency bands but will be defined by its principal emission band.

In one or more embodiments of the acoustic enclosure E, the at least one front acoustic source Say and the at least one lateral acoustic source Slat are high frequency, and/or medium frequency, and/or low frequency, and/or very low frequency acoustic sources working in substantially the same frequency band. According to one or more embodiments, this same frequency band comprises one or more among: the very low frequency band, the low frequency band, the medium frequency band, the high frequency band.

According to an embodiment, said same frequency band comprises one or more frequency bands other than the high frequency band.

According to a variant embodiment, the at least one front acoustic source Say and the at least one lateral acoustic source Slat are acoustic sources working respectively in frequency bands partially overlapping in an interval in which directivity control is desired.

In one or more embodiments of the loudspeaker E, the at least one front acoustic source Say and the at least one lateral acoustic source Slat are configured to be individually fed by DSP and amplifier channels and electronically controlled in amplitude and phase. The DSP channel feeding, and electronic amplitude and phase control are intended to control the directivity of the sound radiation from the acoustic enclosure E.

The sound flow distribution created by the use of the at least one waveguide G in the loudspeaker E thus allows for a wider range of directivities of the loudspeaker E through the feeding of the DSP channels and the electronic control in amplitude and phase of the at least one front acoustic source Say and of the at least one lateral acoustic source Slat. The waveguide G allows for better control and a wider range of directivities of loudspeakers having lateral sources in addition to their main forward emitting sources.

Two examples will be described, which show the control of directivity that can be achieved by the use of a waveguide in an acoustic enclosure E with front and lateral sources.

Example 1: DSP Solution with Perfect Alignment in the Axis

Here we consider a symmetrical enclosure E with a front low-frequency source and a low-frequency source on two sides of the loudspeaker. The sources are fed by DSP channels and electronically controlled in amplitude and phase. The control performed aims at a perfect alignment in the 0° direction axis Day of the enclosure (E). FIGS. 15A to 15D show the curves for the evolution of the sound level (SPL) (also called modulus or magnitude) and the phase difference between the front sources and the sources on each side of the loudspeaker E, as a function of the sound frequency. Several listening directions, between 0° and 90°, i.e. distributed in the front hemisphere of the enclosure E are shown. The two configurations without and with waveguide are shown. It can be observed that the waveguide G allows a better control of the directivity lobe due to the new definition of the emissive part constituted by the front and rear ports OSlLt_av and OSlat_ar.

Indeed, on the magnitude curves, it can be observed that the waveguide allows the sound level to be raised on the sides of the directivity lobe centred on the Day axis. The waveguide allows a more homogeneous distribution of sound in the front hemisphere of the enclosure E.

Furthermore, on the phase difference curves, it can be observed that the G-waveguide allows to tighten the different curves corresponding to the different directions of observation between 0° and 90°, in particular for the frequencies between 180 Hz and 380 Hz. The scattering is thus more homogeneous over a wider frequency band thanks to the use of waveguide G.

Example 2: DSP Solution for Rear Rejection Optimization

Here we consider a symmetrical enclosure E with a front low-frequency source and a low-frequency source on two sides of the enclosure. The sources are fed by DSP channels and electronically controlled in amplitude and phase. The control is aimed at optimizing the rejection at the rear of the cabinet. FIGS. 16A to 16D show the curves for the evolution of the sound level (SPL) (also called modulus or magnitude) and the phase difference between the front sources and the sources on each side of the enclosure E, as a function of frequency. Several directions of emission, between 0° and 180°, i.e. distributed in a half-space, indifferently left or right of the enclosure E because of its symmetry, are represented. The two configurations without and with waveguide are presented.

On the amplitude curves, it can be observed that with the G waveguide, the sound level, SPL, decreases less quickly in the front hemisphere of the loudspeaker, i.e. for listening directions between 0° and 90°. On the other hand, the narrowing of the curves for the directions between 900 and 1800 shows that the waveguide provides better rejection homogeneity in the rear space.

On the phase difference curves between the front low frequency sources and one of the lateral low frequency sources on one of the lateral faces, it can be observed that the curves relative to the enclosure coverage cone, i.e. between 0° and 50°, are tightened near the axis defining a zero phase difference. This reflects a better temporal alignment in the front hemisphere of the enclosure E, i.e. in the 0° axis and off this axis.

In addition to better control of the directivity of an enclosure E comprising at least one waveguide as described above, the use of such waveguides, for products comprising acoustic sources on the sides, provides certain advantages in terms of mechanical and assembly properties.

In the case of an acoustic enclosure E comprising at least one front acoustic source Sav, at least one lateral acoustic source Slat, and at least one sound waveguide G positioned in front of the at least one lateral acoustic source Slat, and where the outer face of the sound waveguide G is flat, the acoustic enclosure E may be stacked with a second acoustic enclosure E' comprising or not a waveguide G' as described in the present application.

The stacking can be done on the side; in this case, the stacking surfaces are the outer face of the waveguide of the enclosure E and one of the lateral faces of the enclosure E'.

In the case where the enclosures E and E' each furthermore comprise a first upper face FEsup and a first lower face FEinf on the one hand, and a second upper face FE'sup and a second lower face FE'inf on the other hand, stacking can be carried out from below or from above. The stacking surfaces are then either the first upper side FEsup and the second lower side FE'inf, or the first lower side FEinf and the second upper side FE'sup.

It is possible with enclosures E as described in the present application to create loudspeaker arrays by stacking loudspeakers comprising waveguides G with a flat outer face from the side and from above or below, some of the enclosures being able to be rotated by 180° relative to the other enclosures.

Alternatively, carrying handles may be assembled on the outer face of a flat outer face G waveguide as described in the present application. In this case, the carrying handles may be designed to be integrated flush with the flat outer face of the G waveguide.

Finally, it is possible to assemble a waveguide G to an enclosure E having sources at the front and sources at the sides directed towards one or other of the lateral faces of the enclosure E, in a manner similar to an external accessory. In this case, the waveguide is joined to either of the lateral faces FElat1 and FElat2 of the enclosure E by joining means.

The invention claimed is:

1. An acoustic enclosure (E) having a volume shape with a front face ($F_{Eav}$), a rear face ($F_{Ear}$), two first and second lateral faces ($F_{Elat1}$) and ($F_{Elat2}$), and said enclosure (E) having a main emission direction ($D_{av}$) perpendicular to the front face ($F_{Eav}$) of the acoustic enclosure (E) as well as a rear emission direction ($D_{ar}$) perpendicular to the rear face ($F_{Ear}$) of the acoustic enclosure (E), said acoustic enclosure (E) comprising:

at least one front acoustic source ($S_{av}$) configured to emit a sound flux through the front face ($F_{Eav}$) and having a main front source emission direction ($D_{Sav}$), said main front source emission direction being substantially equal to the main emission direction ($D_{av}$) of the acoustic enclosure (E), at least one lateral acoustic source ($S_{lat}$) oriented towards at least one lateral face with source ($F_{Elat}$), at least one lateral acoustic source (S) oriented towards at least one lateral face with a source (F), the said lateral face with a source ($F_{Elat}$) being one and/or the other of the two first and second lateral faces ($F_{Elat1}$) and ($F_{Elat2}$), the said lateral acoustic source ($S_{lat}$) having a main lateral source emission direction ($D_{Slat}$) substantially perpendicular to one and/or the other of the lateral faces ($F_{Elat1}$) and ($F_{Elat2}$), said front acoustic source ($S_{av}$) and said lateral acoustic source ($S_{lat}$) working in substantially a same frequency range;

at least one waveguide (G) being positioned in front of the at least one lateral acoustic source (S) so as to occlude the sound flux (F) emitted from lateral side acoustic source ($S_{lat}$) in the main lateral source emission direction ($D_{Slat}$), and to direct the sound flux ($F_{lat}$) emitted from said lateral acoustic source to two first and second pluralities of lateral directions on either side of the lateral source emission direction ($D_{Slat}$), and said waveguide (G) being joined to said lateral face with source ($F_{Elat}$) by upper and lower walls ($G_{sup}$, $G_{inf}$) of the acoustic enclosure (E), at least one front orifice ($O_{SLat\_av}$) formed by a space between said lateral face with source ($F_{Elat}$) and said sound waveguide (G) at least one front orifice ($O_{SLat\_av}$) formed by a space between the said lateral face with source (F) and the said sound waveguide (G), so as to allow the sound flow ($F_{lat}$) emitted by the lateral acoustic source ($S_{lat}$) to pass in directions pointing towards a hemisphere defined by the main direction of emission ($D_{av}$), at least one rear orifice ($O_{SLat\_ar}$) formed by a space between the said lateral face with source ($F_{Elat}$) and the said sound waveguide (G), so as to allow the sound flow ($F_{lat}$) emitted by the lateral acoustic source ($S_{lat}$) to pass in directions pointing towards a hemisphere defined by the rear direction of emission ($D_{ar}$) of the enclosure, the walls ($G_{sup}$, $G_{inf}$) for occluding the sound flux ($F_{lat}$) reflected by said at least one waveguide (G) in directions other than the directions in which said at least one front orifice (O) and at least one rear orifice (O) let said sound flux ($F_{lat}$) pass, with the aim of increasing the flux emitted by these orifices to reinforce cardioid directivity.

2. The acoustic enclosure (E) according to claim 1, wherein the at least one front sound source ($S_{av}$) is located in a front volume ($V_{Sav}$) and the at least one lateral sound source ($S_{lat}$) located in a side volume (VSLat) separated from the volume ($V_{Sav}$) by at least one partition (C).

3. The acoustic enclosure (E) according to claim 1, wherein said front acoustic source ($S_{av}$) and said lateral acoustic source ($S_{lat}$) are configured to be individually fed by DSP and amplification channels and electronically controlled in amplitude and phase so as to control the directivity of the sound radiation of the loudspeaker (E).

4. The acoustic enclosure (E) according to claim 1, wherein said loudspeaker (E) is adapted to be stacked with a second loudspeaker (F') according to claim 1, wherein said loudspeakers (E) and (F') each further comprise a first upper face ($F_{Esup}$) and a first lower face ($F_{Einf}$) on the one hand, and a second upper face (F) and a second lower face (F) on the other hand wherein the acoustic enclosures (E) and (F') each further comprise a first upper face (F) and a first lower face (F) on the one hand, and a second upper face ($F_{E'sup}$) and a second lower face ($F_{E'inf}$) on the other hand, wherein said acoustic enclosure (E) is adapted to be stacked with the second acoustic enclosure (F') from below, from above, or from the side.

5. The acoustic enclosure (E) according to claim 1, of the bass reflex type, further comprising at least one vent associated with the at least one lateral acoustic source ($S_{Lat}$), wherein the at least one vent is positioned on the rear face ($F_{Ear}$) of the acoustic enclosure (E).

6. The acoustic enclosure (E) according to claim 1, wherein said front acoustic source and said lateral acoustic source ($S_{lat}$) are acoustic sources both working substantially in a low frequency range and/or in a medium frequency range.

7. The acoustic enclosure (E) according to claim 1, wherein said walls ($G_{sup}$, $G_{inf}$) occluding the sound flow connect the lateral face with source ($F_{Eiat}$) and said sound waveguide (G) in a solid and continuous manner on an upper face ($F_{Esup}$) and a lower face ($F_{Einf}$) of the sound enclosure (E).

8. The acoustic enclosure (E) according to claim 1, wherein the walls ($G_{sup}$, $G_{inf}$) occluding the sound flow are configured to occlude the sound flux reflected by the acoustic wave guide in directions perpendicular on one hand to the direction of emission of the main direction of emission of the lateral acoustic source ($D_{Slat}$) and on the other hand to upper face ($F_{Esup}$) and the lower face ($F_{Einf}$).

* * * * *